United States Patent
Awad et al.

(10) Patent No.: US 12,114,324 B2
(45) Date of Patent: Oct. 8, 2024

(54) COMMUNICATION SYSTEM

(71) Applicant: NEC Corporation, Tokyo (JP)

(72) Inventors: Yassin Aden Awad, Uxbridge (GB); Robert Arnott, London (GB)

(73) Assignee: NEC Corporation (JP)

( * ) Notice: Subject to any disclaimer, the term of this patent is extended or adjusted under 35 U.S.C. 154(b) by 0 days.

(21) Appl. No.: 17/578,810

(22) Filed: Jan. 19, 2022

(65) Prior Publication Data

US 2022/0141807 A1    May 5, 2022

Related U.S. Application Data

(63) Continuation of application No. 16/921,265, filed on Jul. 6, 2020, now Pat. No. 11,272,498, which is a (Continued)

(30) Foreign Application Priority Data

Jan. 28, 2014 (GB) ..................... 1401459

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0053* (2013.01); *H04W 4/70* (2018.02);
(Continued)

(58) Field of Classification Search
None
See application file for complete search history.

(56) References Cited

U.S. PATENT DOCUMENTS 10,721,721 B2   7/2020   Awad ............... H04W 72/0405
2004/0266446 A1   12/2004   Nguyen et al.
(Continued)

FOREIGN PATENT DOCUMENTS

CN    101622902 A    1/2010
CN    101925107 A    12/2010
(Continued)

OTHER PUBLICATIONS

Extended European Search Report for EP Application No. 21217190.4 dated on Apr. 20, 2022.
(Continued)

*Primary Examiner* — Jutai Kao
(74) *Attorney, Agent, or Firm* — NEC-IPC

(57) ABSTRACT

A communications system is described that has a base station and a number of user devices, including legacy user devices and non-legacy user devices. The base station generates control data for transmission to the user devices, the control data including common control data for reception and decoding by a plurality of user devices and user specific control data for reception and decoding by a specific user device. The common control data is for reception and decoding by the non-legacy user devices and cannot be decoded by the legacy user devices. The common control data is repeated within multiple subframes for reception and decoding by non-legacy user devices. The non-legacy user devices are typically Machine Type Communications (MTC) user devices.

10 Claims, 15 Drawing Sheets

Related U.S. Application Data continuation of application No. 15/110,998, filed as application No. PCT/JP2015/052603 on Jan. 23, 2015, now Pat. No. 10,721,721.

(51) Int. Cl.
    *H04W 4/70*     (2018.01)
    *H04W 72/0446*     (2023.01)
    *H04W 72/20*     (2023.01)
    *H04W 72/51*     (2023.01)

(52) U.S. Cl.
    CPC ....... *H04W 72/0446* (2013.01); *H04W 72/20* (2023.01); *H04W 72/51* (2023.01)

(56) References Cited

U.S. PATENT DOCUMENTS

| | | | |
|---|---|---|---|
| 2010/0091724 | A1 | 4/2010 | Ishii et al. |
| 2012/0063369 | A1 | 3/2012 | Lin et al. |
| 2013/0003639 | A1 | 1/2013 | Noh et al. |
| 2013/0077583 | A1 | 3/2013 | Kim |
| 2013/0194956 | A1 | 8/2013 | Sartori .............. H04W 74/0833 370/252 |
| 2013/0242882 | A1 | 9/2013 | Blankenship et al. |
| 2013/0250880 | A1 | 9/2013 | Liao et al. |
| 2013/0301549 | A1* | 11/2013 | Chen .................... H04L 5/1469 370/329 |
| 2013/0315159 | A1 | 11/2013 | Xia .................... H04W 72/1273 370/329 |
| 2014/0177556 | A1 | 6/2014 | Pan et al. |
| 2014/0286281 | A1 | 9/2014 | Jang et al. |
| 2014/0301305 | A1 | 10/2014 | Xu et al. |
| 2015/0188684 | A1 | 7/2015 | Takeda et al. |
| 2015/0230210 | A1* | 8/2015 | Lee ....................... H04W 72/23 370/329 |
| 2015/0295690 | A1* | 10/2015 | Takeda ................. H04B 7/0452 370/329 |
| 2016/0174014 | A1 | 6/2016 | You et al. |
| 2016/0183222 | A1* | 6/2016 | Suzuki ................. H04L 5/0073 370/336 |
| 2016/0249331 | A1 | 8/2016 | Park et al. |
| 2016/0278054 | A1* | 9/2016 | You .......................... H04W 4/70 |
| 2016/0373229 | A1 | 12/2016 | You et al. |
| 2017/0085352 | A1 | 3/2017 | Seo et al. |
| 2017/0325048 | A1 | 11/2017 | Jamadagni et al. |
| 2018/0070313 | A1 | 3/2018 | Papasakellariou et al. |

FOREIGN PATENT DOCUMENTS

| | | |
|---|---|---|
| CN | 103120010 A | 5/2013 |
| JP | 2013-239782 A | 11/2013 |
| WO | 2012/155690 A1 | 11/2012 |
| WO | 2013/066100 A1 | 5/2013 |
| WO | 2013/125784 A1 | 8/2013 |
| WO | 2013/170227 A1 | 11/2013 |

OTHER PUBLICATIONS

ZTE: "Discussion on Control Channel Coverage Improvement", 3GPP Draft; R1-135360 Control, 3rd Generation Partnership Project (3GPP), Mobile Competence Centre ; 650, Route Des Lucioles ; F-06921 Sophia-Antipolis Cedex ; France, vol. RAN WG1, No. San Francisco, USA, Nov. 11, 2013-Nov. 15, 2013, Nov. 2, 2013, XP050750945.
LG Electronics: "PDCCH transmission for MTC coverage enhancement". 3GPP Draft; R1-135461 MTC_CE for PDCCH (Final), 3rd Generation Partnership Project (3GPP), Mobile Competence Centre : 650, Route Des Lucioles ; F-06921 Sophia-Antipolis Cedex : France, vol. RAN WG1, No. San Francisco, USA: Nov. 11, 2013-Nov. 15, 2013, Nov. 13, 2013, XP050735134.
Samsung: "PDCCH Coverage Enhancements for MTC UEs," 3GPP; R1-135198 MTC Coverage PDCCH, 3rd Generation Partnership Project (3GPP), Mobile Competence Centre ; 650, Route Des Lucioles, F-06951 Sophia-Antipolis Cedex ; France, vol. RAN WG1, No. San Fran USA, Nov. 11, 2013-Nov. 15, 2013, Nov. 13, 2013, XP050734896.
3rd Generation Partnership Project; Technical Specification Group Radio Access Network; "Study on provision of low-post Machine-Type Communications (MTC) User Equipments (UEs) based on LTE (Release 12)", 3GPP Standard; 3GPP TR 36.888, 3rd Generation Partnership Project (3GPP), Mobile Competence Centre ; 650, Route Des Lucioles ; F-06921 Sophia-Antipolis Cedex ; France, vol. RAN WG1, No. V12.0.0, Jun. 25, 2013.
3rd Generation Partnership Project; Technical Specification Group Radio Access Network; "Evolved Universal Terrestrial Radio Access (E-UTRA) Physical layer procedures (Release 12)", 3GPP Standard: 3GPP TS 36.213. 3rd Generation Partnership Project (3GPP), Mobile Competence Centre ; 650, Route Des Lucioles ; F-06921 Sophia-Antipolis Cedex ; France, vol. RAN WG1, No. V12.0.0, 15, Dec. 15, 2013, XP050729032.
Huawei, "Discussion on (E)PDCCH and PUCCH coverage improvement for MTC UEs" R1-135021, 3GPP TSG RAN WG1 Meeting #75, San Francisco, USA, Nov. 11-15, 2013.
International Search Report for PCT Application No. PCT/JP2015/052603, mailed on Jun. 29, 2015.
English translation of Written opinion for PCT Application No. PCT/JP2015/052603.
United Kingdom Search Report for GB1401459.1 searched on May 16, 2014.
3GPP TSG-RAN WG1 #75, MediaTek Inc. "On the need of PDCCH for SIB and other Common Channels", R1-135422, Nov. 11 -15, 2013, San Francisco, USA.
3GPP TSG RAN WG1 Meeting #68bis, IPWireless Inc. "Analysis of company submissions with resulting Text Proposal for single receive RF chain for low cost MTC UEs", R1-120961, Mar. 26-30, 2012, Jeju Island, South Korea.
3GPP TSG RAN WG1 Meeting #66bis, Research in Motion, UK Limited, "Support Common Control Channel in E-PDCCH", R1-121479, Mar. 26-30, 2012, Jeju Island, South Korea.
3GPP TSG-RAN WG1 #75, Intel Corporation, "Coverage enhancement of DL/UL control channels for low cost MTC", R1-135105, Nov. 11-15, 2013, San Francisco, USA.
Japanese Office Action for JP Application No. 2016-565940 mailed on Apr. 26, 2017 with English Translation.
Japanese Office Action for JP Application No. 2016-565940 mailed on Nov. 22, 2017.
Communication dated Jul. 27, 2018, from the State Intellecutal Property Office of People's Republic of China in counterpart Application No. 201580006394.4.
Communication dated Aug. 15, 2018, from the European Patent Office in counterpart European Application No. 15703835.7.
Ericsson: "Physical downlink control channel for enhanced coverage MTG UE", 3GPP TSG RAN WG1 Meeting #75, R1-135645 Nov. 11-15, 2013, San Francisco, CA, USA; XP050735303, Retrieved from the Internet: URL:http://www.3gpp.org/ftp/Meetings_3GPP_SYNC/RAN/RAN1/Docs/ (6 pages total).
Sharp; "Common search space in ePDCCH and fallback operation in Rel-11", 3GPP TSG RAN WG1 Meeting #69; R1-122390, Prague, Czech Republic; May 21-25, 2012, XP050600647 (6 pages total).
Motorola Mobility: "MTC Coverage improvement for Control Channels", 3GPP TSG RAN WG1 Meeting #75; R1-135674, San Francisco; Nov. 11-15, 2013, XP050735329, Retrieved from the Internet; URL:http://www.3gpp.org/ftp/Meetings_3GPP_SYNC/RAN/RAN1/Docs/ (2 pages total).
Motorola Mobility: "Support for Common Search Space for EPDCCH", 3GPP TSG RAN WG1 #68bis; R1-121585 Mar. 26-30, 2012, Jeju, Korea; XP050599849 (3 pages total).

* cited by examiner

COMMUNICATION SYSTEM

CROSS-REFERENCE TO RELATED APPLICATIONS

The present application is a continuation application of U.S. patent application Ser. No. 16/921,265 filed on Jul. 6, 2020, which is a continuation application of U.S. patent application Ser. No. 15/110,998 filed on Jul. 12, 2016, which is issued as U.S. Pat. No. 10,721,721, which is a National Stage Entry of international application PCT/JP2015/052603, filed on Jan. 23, 2015, which claims the benefit of priority from UNITED KINGDOM Patent Application 1401459.1 filed on Jan. 28, 2014, the disclosures of all of which are incorporated in their entirety by reference herein.

TECHNICAL FIELD

The present invention relates to mobile communications devices and networks, particularly but not exclusively those operating according to the $3^{rd}$ Generation Partnership Project (3GPP) standards or equivalents or derivatives thereof. The invention has particular although not exclusive relevance to the Long Term Evolution (LTE) of UTRAN (called Evolved Universal Terrestrial Radio Access Network (E-UTRAN)), including LTE-Advanced.

BACKGROUND ART

In a mobile (cellular) communications network, user devices (also known as User Equipment (UE), for example mobile telephones) communicate with remote servers or with other user devices via base stations. In their communication with each other, user devices and base stations use licensed radio frequencies, which are typically divided into frequency bands and/or time blocks.

In order to be able to communicate via the base stations, user devices need to monitor control channels operated by the base stations. One of these control channels, the so-called Physical Downlink Control Channel (PDCCH) carries the scheduling assignments and other control information. The PDCCH serves a variety of purposes. Primarily, it is used to convey the scheduling decisions to individual user devices, i.e. scheduling assignments for uplink and downlink communication.

The information carried on the PDCCH is referred to as downlink control information (DCI). Physical control channels, such as the PDCCH, are transmitted on an aggregation of one or several consecutive Control Channel Elements (CCEs), where a control channel element corresponds to nine Resource Element Groups (REGs). Each REG has four Resource Elements (REs).

Recent developments in telecommunications have seen a large increase in the use of machine-type communications (MTC) user devices which are networked devices arranged to communicate and perform actions without human assistance. Examples of such devices include smart meters, which can be configured to perform measurements and relay these measurements to other devices via a telecommunication network. Machine-type communications are also known as machine 2 machine (M2M) communications. It is envisaged that MTC user devices will play an important role in the implementation of the concept of the "internet of things". It is common for MTC devices, such as smart meters or domestic appliances, to remain in a fixed location or exhibit low mobility. Such devices may also be deployed deep inside buildings where network coverage is low. For example, some MTC user devices may be installed in the basement of a residential building or in a location shielded by foil-backed insulation or metallised windows. These MTC devices will experience greater penetration losses on the air interface than normal user devices.

The lack of network coverage, in combination with the often limited functionality of MTC user devices, can result in such MTC user devices having a low data rate and therefore there is a risk of some messages or channels, such as the PDCCH, not being received by an MTC user device. In order to mitigate this risk, it is desirable to increase the coverage of the PDCCH (and/or, where applicable, the evolved physical downlink control channel, EPDCCH).

One approach proposed for the enhancement of coverage is the repetition of (E)PDCCH across multiple subframes. However, enhancing coverage presents challenges relating to how carrier frequencies should be aggregated, how and where to signal a control channel in radio frames, and how to ensure that user equipment, including MTC and legacy devices, can efficiently locate and interpret the control signalling.

SUMMARY OF INVENTION

The present invention seeks to provide systems, devices and methods which at least partially address the above issues.

The present invention provides a communications node (such as a base station) that schedules resources for use by a plurality of user devices, including legacy user devices and non-legacy user devices, for communicating with the communications node, the communications node comprising: means for generating control data for transmission to the user devices, the control data including common control data for reception and decoding by a plurality of user devices and user specific control data for reception and decoding by a specific user device; and means for transmitting the generated control data in a sequence of subframes for reception by the user devices; wherein the means for generating is configured to generate common control data for reception and decoding by the non-legacy user devices which cannot be decoded by the legacy user devices; and wherein the means for transmitting is configured to transmit repeats of the common control data generated for reception and decoding by non-legacy user devices within a plurality of subframes.

In one exemplary embodiment, the control data is transmitted using a plurality of control channel elements, CCEs, and the common control data for reception and decoding by the non-legacy user devices is transmitted using an aggregation of at least sixteen CCEs that cannot be decoded by the legacy user devices.

In another exemplary embodiment, the common control data for reception and decoding by the non-legacy user devices is encrypted using an encryption key that is unavailable to the legacy user devices.

In another exemplary embodiment, the control data is transmitted in a physical downlink common control channel, PDCCH, wherein common control data for legacy user devices is located in a first part of the PDCCH and user specific control data for legacy user devices is located in a second part of the PDCCH; and wherein the common control data for the non-legacy user devices is located in the second part of the PDCCH.

In another exemplary embodiment, each subframe includes a physical downlink common control channel, PDCCH, part and a physical downlink shared channel, PDSCH, part and wherein the common control data for reception and decoding by the non-legacy user devices is transmitted within the PDSCH part of the subframe.

The communications node may be configured to transmit signalling information to the non-legacy user devices identifying the subframes in which the common control data for reception and decoding by the non-legacy user devices is transmitted. In this case, the data identifying the subframes may identify only multimedia broadcast single frequency network, MBSFN, subframes as carrying the common control data for reception and decoding by the non-legacy user devices. Alternatively, the data identifying the subframes may identify multimedia broadcast single frequency network, MBSFN, subframes and non-MBSFN subframes as carrying the common control data for reception and decoding by the non-legacy user devices. In this case, the communications node may avoid placing the common control data for reception and decoding by the non-legacy user devices and channel state information reference signals, CSI-RS, in the same subframe.

Typically, the communications node is configured to transmit said signalling information using a physical broadcast channel, PBCH. Where the communications node communicates with the user devices using radio frames having N subframes, the signalling information may comprise N bits, one bit for identifying if a corresponding one of the N subframes carries the common control data for reception and decoding by the non-legacy user devices. Alternatively, the signalling information may comprise M bits, where M is less than N, that identify one of a number of predetermined configuration of the N subframes that will carry the common control data for reception and decoding by the non-legacy user devices. Where the data identifying the subframes identifies multimedia broadcast single frequency network, MBSFN, subframes and non-MBSFN subframes as carrying the common control data for reception and decoding by the non-legacy user devices, the M bits may jointly or separately encode which MBSFN subframes and which non-MBSFN subframes of a radio frame will carry the common control data for reception and decoding by the non-legacy user devices.

In some exemplary embodiments, the communications node is configured to transmit the common control data for reception and decoding by the non-legacy user devices in subframes that do not include channel state information reference signals, CSI-RS, or channel reference signals, CRS—or that do not include both CSI-RS and CRS reference signals. Alternatively, the communications node may transmit the common control data for reception and decoding by the non-legacy user devices in subframes that include channel state information reference signals, CSI-RS, or channel reference signals, CRS; and avoids using resources to carry the common control data for reception and decoding by the non-legacy user devices that are used (or might be used) to carry the CSI-RS or the CRS.

In some exemplary embodiments, the communications node transmits signalling information to the non-legacy user devices identifying the location within a subframe of the common control data for reception and decoding by the non-legacy user devices. There may be a fixed number of possible locations within a subframe where the common control data may be located, and in this case the communications node signals data identifying one of the possible locations. Alternatively, there may be a fixed number of possible locations within a subframe for the common control data for reception and decoding by the non-legacy user devices, and the communications node may transmit the common control data in a location that depends upon a static or semi static system variable, such as a cell ID associated with the communications node.

In some exemplary embodiments, the communications node signals data identifying a size of the common control data for reception and decoding by the non-legacy user devices. In this case, the size of the common control data may be one of a plurality of possible sizes and the communications node may signal data indicating one of the plurality of sizes to the non-legacy user devices.

Typically the common control data is carried on a plurality of resource blocks, RBs, that may be either arranged contiguously within a subframe or dispersed within the subframe.

The present invention also provides a communications node that schedules resources for use by a plurality of user devices for communicating with the communications node, the communications node comprising: means for generating control data for transmission to the user devices, the control data including common control data for reception and decoding by a plurality of user devices and user specific control data for reception and decoding by a specific user device; means for generating reference signals for use in controlling communications between the communications node and the user devices; and means for transmitting the generated reference signals and the generated control data in a sequence of subframes for reception by the user devices, each subframe including a physical downlink common control channel, PDCCH, part and a physical downlink shared channel, PDSCH, part; wherein generated reference signals and common control data for reception and decoding by a plurality of user devices are transmitted within the PDSCH part of the subframe; and wherein the means for transmitting is configured to transmit said common control data and said reference signals within the PDSCH part of subframes using different resource blocks contained therein.

The communications node may be configured to carry the common control data in subframes that do not include channel state information reference signals, CSI-RS, or channel reference signals, CRS.

The communications node may be configured to transmit the common control data in subframes that include channel state information reference signals, CSI-RS, or channel reference signals, CRS; and may be configured to avoid using resources to carry the common control data that are used to carry the CSI-RS or the CRS.

In some exemplary embodiments, the communications node transmits signalling information to the user devices identifying the location and/or size, within a subframe, of the common control data.

Typically, the communications node starts said common control data on a starting symbol of the subframe that is known in advance by the non-legacy user devices. The starting symbol may be different depending on the type of subframe; and the non-legacy user device maintains knowledge of the starting symbol to help identify the location of the control data within the received subframe.

The present invention also provides a communications system comprising the above described communications node and at least one user device for receiving and decoding the common control data to control communications between the user device and the communications node.

In one exemplary embodiment, the user device comprises: means for receiving control data transmitted by the communications node, the control data including common control data for reception and decoding by the user device and user specific control data for reception and decoding by a specific user device; wherein the received common control data is for reception and decoding by non-legacy user devices and cannot be decoded by legacy user devices; wherein the means for receiving is configured to receive a plurality of subframes comprising said common control data; means for combining the control data received from the plurality of subframes; and means for decoding the combined common control data.

In another exemplary embodiment, the user device comprises: means for receiving subframes transmitted by the communications node, the subframes comprising control data including common control data for reception and decoding by a plurality of user devices and user specific control data for reception and decoding by a specific user device; wherein the subframes include reference signals transmitted by the communications node for use in controlling communications between the communications node and the user device; and wherein the means for receiving is configured to receive a plurality of subframes comprising said common control data; wherein each subframe includes a physical downlink common control channel, PDCCH, part and a physical downlink shared channel, PDSCH, part; wherein received reference signals and common control data are received within the PDSCH part of the subframe using different resource blocks contained within the PDSCH part; means for combining the control data received from the plurality of subframes; and means for decoding the combined common control data.

In another exemplary embodiment, the user device comprises: means for receiving subframes transmitted by the communications node, the subframes comprising control data including common control data for reception and decoding by a plurality of user devices and user specific control data for reception and decoding by a specific user device; wherein the subframes include reference signals transmitted by the communications node for use in controlling communications between the communications node and the user device; and wherein the means for receiving is configured to receive a plurality of subframes comprising said common control data; wherein each subframe includes a physical downlink common control channel, PDCCH, part and a physical downlink shared channel, PDSCH, part; wherein received reference signals and common control data are received within the PDSCH part of the subframe using different resource blocks contained within the PDSCH part; means for identifying the common control data within the PDSCH part of the subframes using information about the location, or the expected location, of the reference control signals; means for combining the control data received from the plurality of subframes; and means for decoding the combined common control data.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described by way of example only with reference to the attached figures in which.

DESCRIPTION OF EMBODIMENTS

Overview

Figure 1:
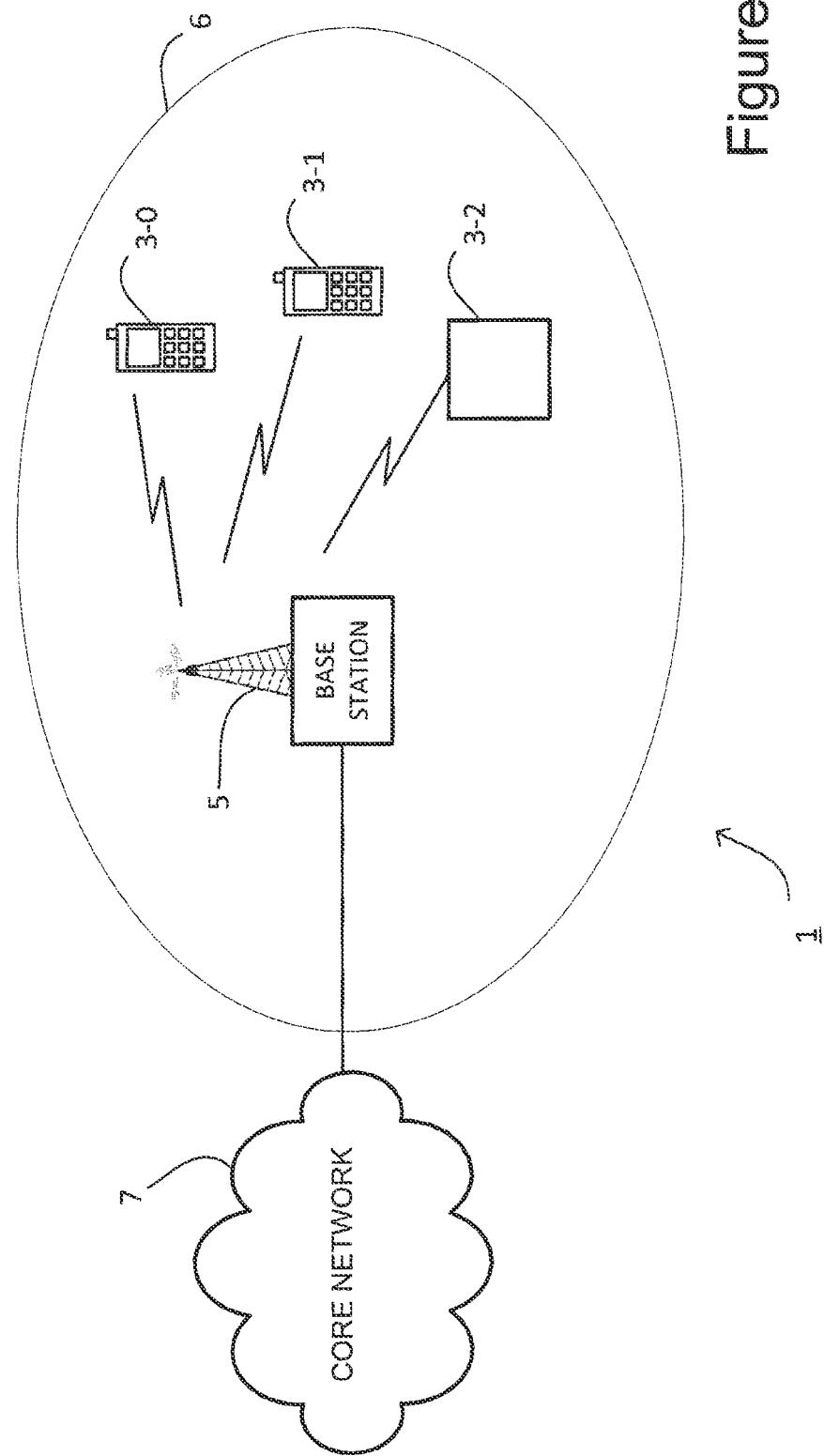
FIG. 1 schematically illustrates a telecommunication system.

FIG. 1 schematically illustrates a mobile (cellular) telecommunication system 1 in which communication between user devices 3-0, 3-1 and 3-2 is supported by a base station 5 and a core network 7. In this exemplary embodiment, user devices 3-0 and 3-1 are mobile telephones, and user device 3-2 is a machine-type communications (MTC) user device. As shown, user devices 3-0, 3-1 and 3-2 are located within a cell 6 operated by the base station 5.

In the system illustrated in FIG. 1, the base station 5 shown is an Evolved Universal Terrestrial Radio Access Network (E-UTRAN) base station. Such base stations are commonly referred to as eNBs (Evolved NodeBs).

The base station 5 is configured to transmit an (E)PDCCH for reception by the user devices 3 in the cell, the (E)PDCCH allocating uplink and downlink resources to the user devices.

Also, base station 5 is configured to provide reference signals which the user devices 3 are operable to receive and use to determine signal quality. Based on the result of measurements, the user devices 3 generate and send a report back to the base station 5. This feedback mechanism is called channel quality indication (CQI) and, it is employed to fine-tune the operation of the base station 5, including resource allocation, scheduling and power of transmission.

As will be described in more detail below, the base station 5 repeats PDCCH transmissions for the MTC user device 3-2 and various alternative techniques for doing so are described below. However, before describing these alternatives, a brief overview of the LTE frame structure will now be given that will help to understand these alternative techniques.

LTE Subframe Data Structure

Figure 2:
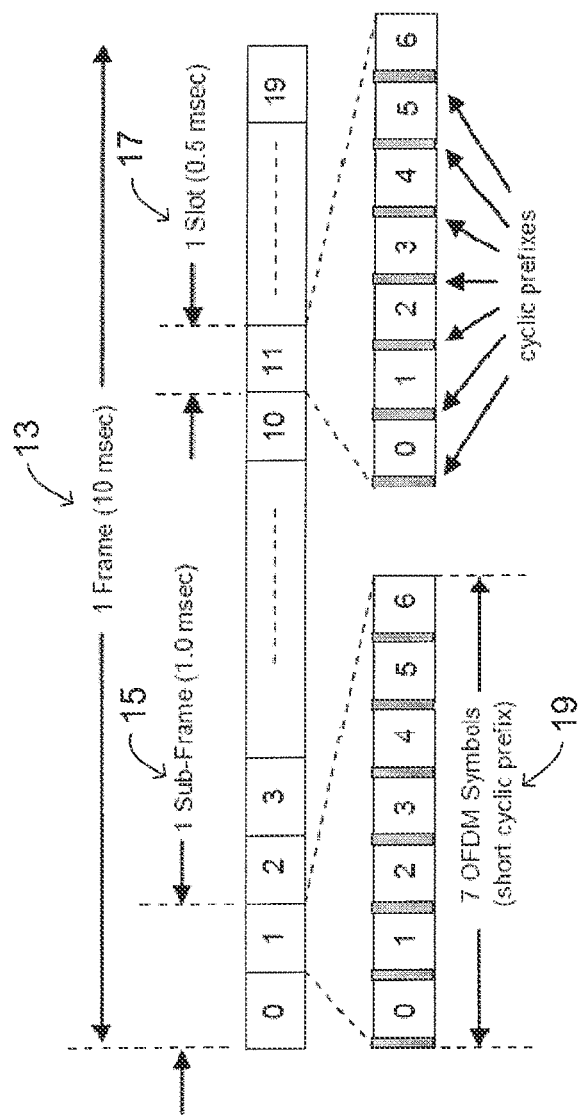
FIG. 2 schematically illustrates a generic frame structure used in communications over the wireless links of the system shown in FIG. 1.

FIG. 2 schematically illustrates a generic frame structure used in communications over the wireless links of the system shown in FIG. 1.

An orthogonal frequency division multiple access (OFDMA) technique is used for the downlink to allow the base station 5 to transmit user data over the air interface to the respective user devices 3; and a single carrier frequency division multiple access (SC-FDMA) technique is used for the uplink to allow the user devices 3 to transmit their data over the air interface to the base station 5. Different sub-carriers are allocated by the base station 5 (for a predetermined amount of time) to each user device 3 depending on the amount of data to be sent in each direction. These sub-carriers and temporal allocations are defined as physical resource blocks (PRBs) in the LTE specifications. PRBs thus have a time and frequency dimension. The base station 5 dynamically allocates PRBs for each device that it is serving and signals the allocations for each subframe (TTI) to each of the scheduled user devices 3 in a control channel, e.g. (E)PDCCH.

As shown in FIG. 2, the generic frame structure agreed for LTE communications over the air interface includes a frame 13 which is 10 msec long and which comprises ten sub-frames of 1 msec duration (known as a Transmission Time Interval (TTI)). Each subframe or TTI comprises two slots 17 of 0.5 msec duration. Each slot 17 comprises either six or seven OFDMA symbols 19, depending on whether the normal or extended cyclic prefix (CP) is employed.

Figure 3:
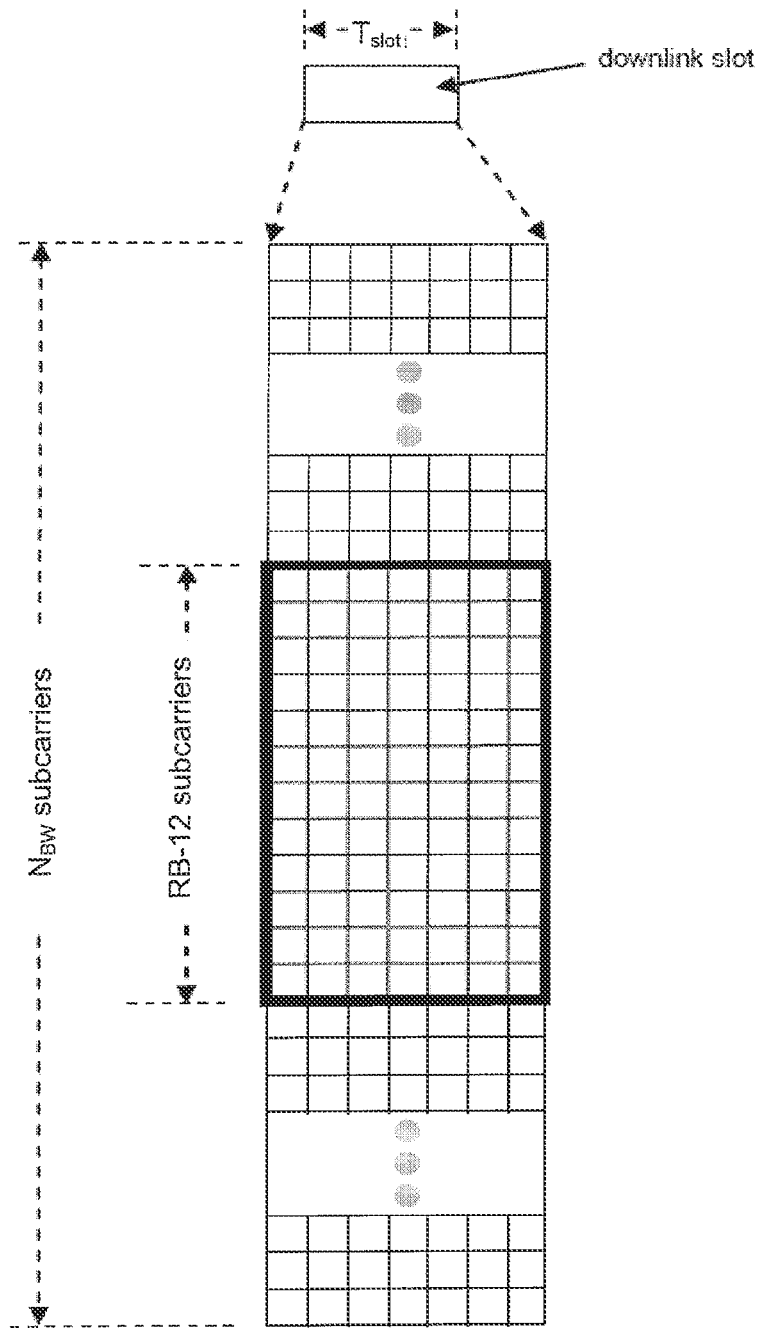
FIG. 3 schematically illustrates the way in which the frequency subcarriers are divided into resource blocks and the way that a time slot is divided into a number of OFDM symbols.

FIG. 3 schematically illustrates the way in which the frequency subcarriers are divided into resource blocks and the way that a time slot is divided into a number of OFDM symbols.

The total number of available sub-carriers depends on the overall transmission bandwidth of the system. The LTE specifications define parameters for system bandwidths from 1.4 MHz to 20 MHz and one PRB is currently defined to comprise either 12 or 24 consecutive subcarriers for one slot. A PRB over two slots is also defined by the LTE specifications as being the smallest element of resource allocation assigned by the base station scheduler. These sub-carriers are then modulated onto a component carrier to up-convert the signal to the desired transmission bandwidth.

The transmitted signal thus comprises $N_{BW}$ subcarriers for a duration of $N_{symb}$ symbols. Each box in the grid represents a single sub-carrier for one symbol period and is referred to as a resource element. As shown in FIG. 3, in this case each PRB 11 is formed from 12 consecutive sub-carriers and (in this example) seven symbols for each subcarrier; although in practice the same allocations are made in the second slot of each subframe as well. The control channel that includes the resource allocation data for the user devices 3 is generally transmitted in consecutive CCEs within the first three OFDM symbols of each subframe 15.

User Device

Figure 4:
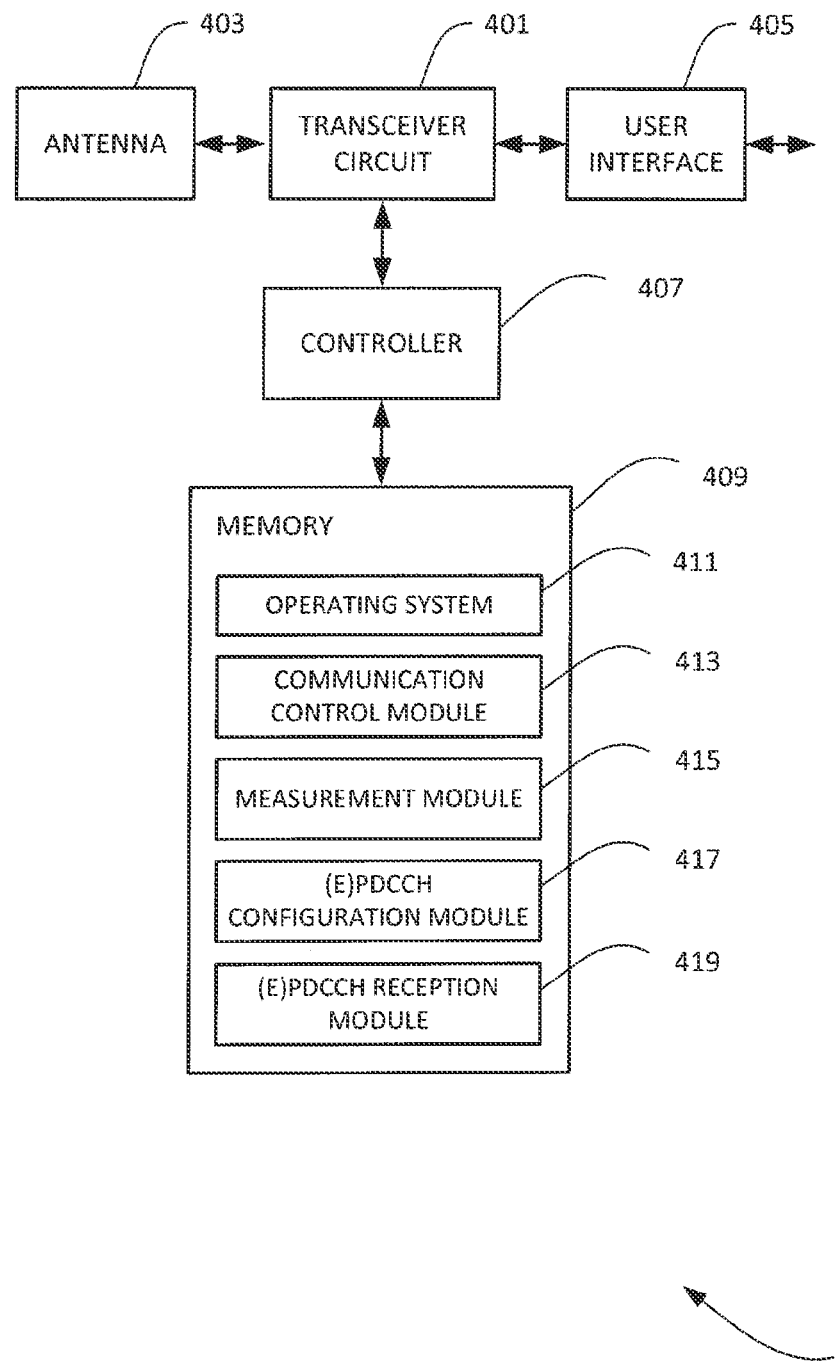
FIG. 4 is a block diagram illustrating the main components of the user device shown in FIG. 1.

FIG. 4 is a block diagram illustrating the main components of the user device 3 shown in FIG. 1. The user device 3 may be an MTC user device 3-2 or a mobile (or 'cellular') telephone capable of operating in a multi-carrier environment. The user device 3 comprises a transceiver circuit 401 which is operable to transmit signals to, and to receive signals from, the base station 5 via at least one antenna 403. Typically, the user device 3 also includes a user interface 405 which allows a user to interact with the user device 3, however this user interface 405 may be omitted for some MTC user devices.

The operation of the transceiver circuit 401 is controlled by a controller 407 in accordance with software stored in memory 409. The software includes, among other things, an operating system 411, a communication control module 413, a measurement module 415, an (E)PDCCH configuration module 417 and an (E)PDCCH reception module 419.

The communication control module 413 is operable for managing communication with the base station 5. The measurement module 415 receives measurement configuration information from the base station 5 for the purposes of configuring the user device 3 to take measurements of the CSI-RS (Channel State Information Reference Signal).

The measurement module 415 determines reference signal received power (RSRP) for the cells. In this exemplary embodiment, the measurement module 415 is operable to carry out signal quality measurements during the periods when the user device 3 is not scheduled to communicate with the base station 5. Based on the result of measurements, the measurement module 415 generates and sends a CSI report (including the CQI) back to the base station 5.

The (E)PDCCH configuration module 417 is operable to receive and process (E)PDCCH configuration information received from the base station 5, such as information identifying the location and size of the (E)PDCCH and/or an associated search space.

The (E)PDCCH reception module 419 is operable to search for, identify and decode an (E)PDCCH, for example receiving DCI which signals a resource allocation for the user device.

Base Station

Figure 5:
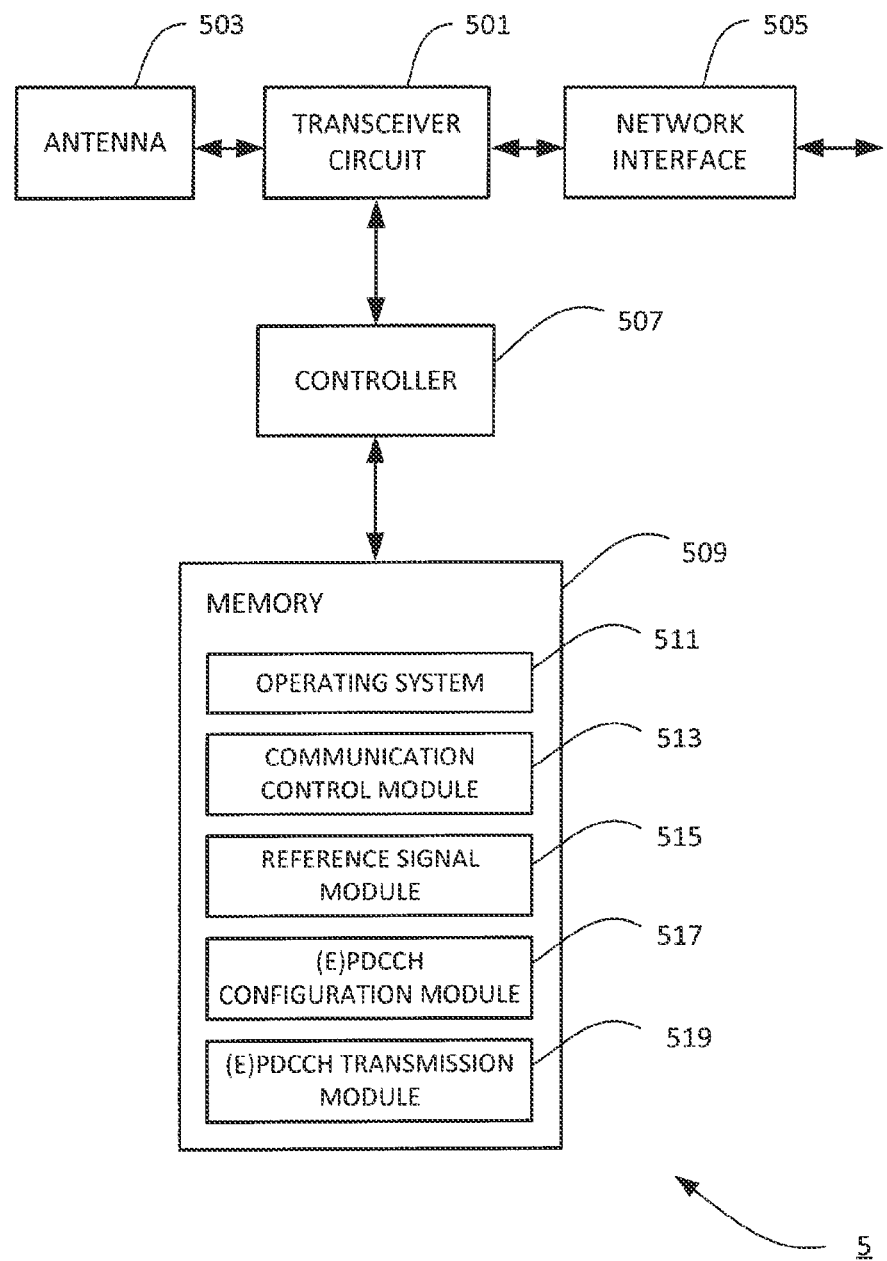
FIG. 5 is a block diagram illustrating the main components of the base station shown in FIG. 1.

FIG. 5 is a block diagram illustrating the main components of the base station 5 shown in FIG. 1. The base station 5 comprises an E-UTRAN multi-carrier capable base station comprising a transceiver circuit 501 which is operable to transmit signals to, and to receive signals from, the user device 3 via one or more antennas 503. The base station 5 is also operable to transmit signals to and to receive signals from a core network 7 via a network interface 505. The operation of the transceiver circuit 501 is controlled by a controller 507 in accordance with software stored in memory 509.

The software includes, among other things, an operating system 511, a communication control module 513, a reference signal module 515, an (E)PDCCH configuration module 517 and an (E)PDCCH transmission module 519.

The communication control module 513 is operable to control communication with the user devices 3. The communication control module 513 is also responsible for scheduling the resources to be used by the user devices 3 served by this base station 5.

The reference signal module 515 is operable to transmit reference signals for reception by the user devices 3, to allow the user devices 3 to carry out signal quality measurements. The reference signal module 515 controls which reference signals are transmitted and in which resource elements and in which subframes.

The (E)PDCCH configuration module 517 is operable to generate and transmit (E)PDCCH configuration information for the user devices 3, such as information identifying the location and size of the (E)PDCCH and/or an associated search space.

The (E)PDCCH transmission module 519 is operable to transmit an (E)PDCCH, for example comprising DCI which signals a resource allocation for a user device.

In the above description, the user device 3 and the base station 5 are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Enhanced Coverage (E)PDCCH—(E)PDCCH Repetition

As discussed above, it is common for MTC user devices 3-2, such as smart meters or domestic appliances, to remain in a fixed location or exhibit low mobility; and to experience greater penetration losses on the air interface than normal user devices. One approach proposed for the enhancement of coverage is the repetition of the (E)PDCCH for MTC user devices 3-2 across multiple subframes.

Figure 6:
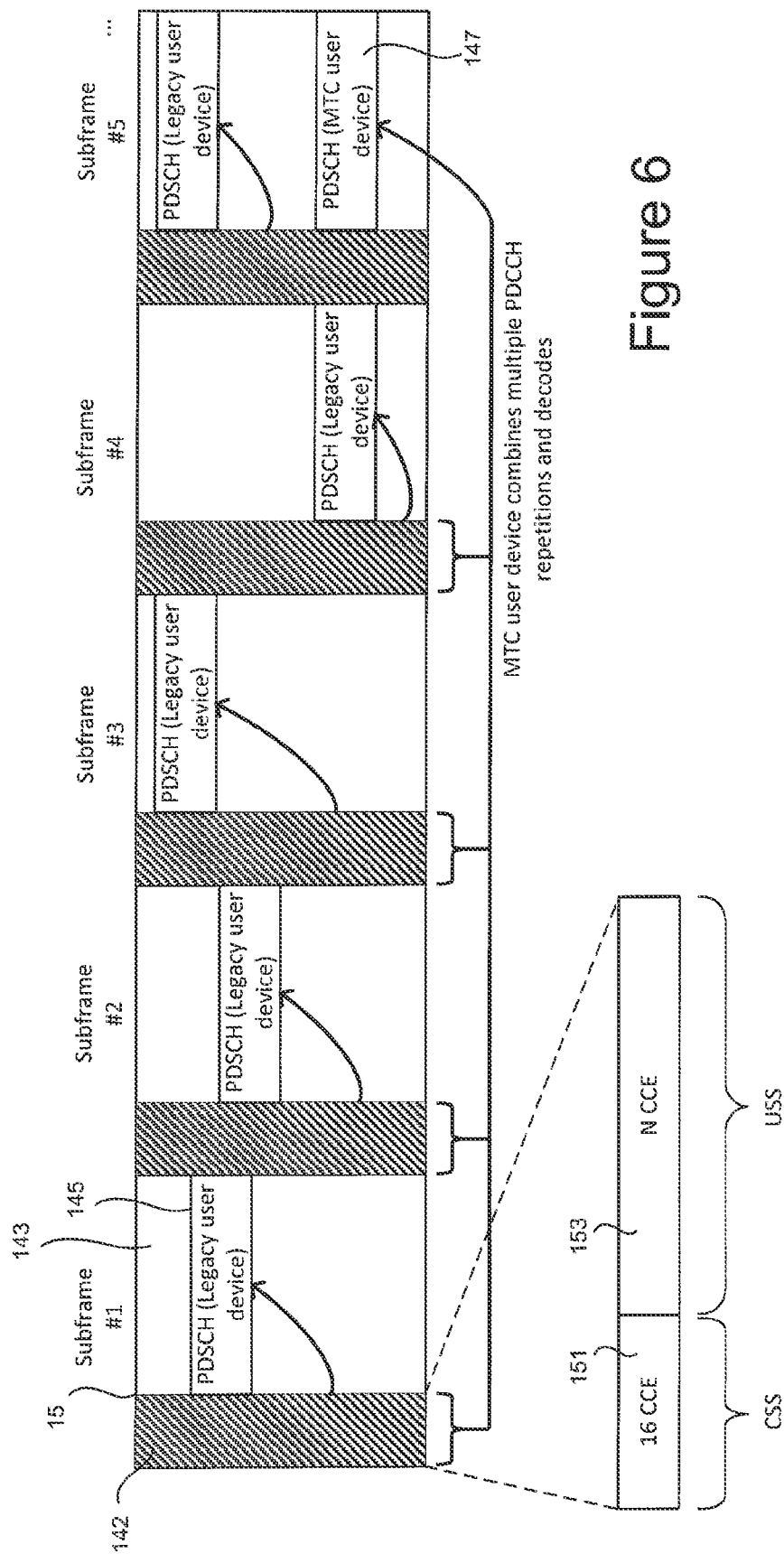
FIG. 6 illustrates a number of subframes forming part of a radio frame for the telecommunications system of FIG. 1.

FIG. 6 illustrates the way in which such repetition may be performed within five subframes 15. As shown in FIG. 6, the first part 142 of each subframe 15 is used to carry the PDCCH. The remainder of each subframe 15 comprises the physical downlink shared channel (PDSCH) 143. The PDSCH resources for each user device 3 are allocated using control information carried in the PDCCH 142.

In this illustration, the PDCCH 142 of each subframe 15 includes control information for both MTC user devices 3-2 and legacy user devices 3-0 and 3-1. The PDCCH data for an MTC user device 3-2 is repeated in subframes 1 to 4. This PDCCH data informs the MTC user device 3-2 of an allocation of resources 147 within the PDSCH of subframe 5 for the MTC user device 3-2. Thus the MTC user device 3-2 can combine the multiple PDCCH repetitions across subframes 1 to 4 before decoding the PDCCH to determine its allocated resources 147 within the PDSCH.

In contrast, the PDCCH information for legacy user devices 3 is in general not repeated across multiple subframes 15. The resources allocated to a particular legacy user device 3 within the PDSCH 145 of a subframe 15 are typically indicated in the PDCCH 142 of that subframe. As illustrated in FIG. 6, the particular resources allocated within the PDSCH may vary in each subframe.

Although not shown in FIG. 6, the PDCCH 142 consists of an aggregation of one or more consecutive control channel elements (CCEs), where a CCE occupies a fraction of the base station's available physical resource blocks (PRBs). In LTE, each CCE corresponds to nine resource element groups, where each resource element group corresponds to eight bits of controlled data assuming QPSK modulation. The total number of CCEs available in a cell depends on the system bandwidth of the cell and the number of OFDM symbols reserved for PDCCH transmission in a given subframe. As stated above, in this embodiment the first three OFDM symbols of each subframe are dedicated to carrying the PDCCH control data.

In order for an MTC user device 3-2 to be able to successfully receive its (E)PDCCH, it is necessary for the MTC user device 3-2 to know the location of the CCEs in each subframe carrying the repetition of the PDCCH, along with the start subframe and end subframe for the repetition and the timing of the subframe in which the resources 147 are allocated relative to the last of the subframes carrying the repeated PDCCH for the MTC user device 3-2. In the example shown in FIG. 6, subframe 1 is the start subframe, subframe 4 is the end subframe for the PDCCH repetitions and the allocated resources 147 are located in subframe 5.

Those involved in the 3GPP standards have discussed how the (E)PDCCH and PDSCH will be configured for MTC user devices 3-2 where the enhanced coverage of the (E)PDCCH is implemented using repetition. It has been agreed that the relationship of PDSCH timing to (E)PDCCH timing shall be known to user devices, for example, this timing may be fixed or the MTC user devices 3-2 may be configured to derive it from other system information. It has also been agreed that, from the perspective of an MTC user device 3-2, the possible starting subframes of the (E)PDCCH repetitions are limited to a subset of subframes within a frame 13. It has also been agreed that where the (E)PDCCH is repeated across multiple subframes, the resources 147 that are being allocated by the (E)PDCCH shall not be transmitted before the end of the (E)PDCCH repetitions. More specifically, if subframe n is the last (E)PDCCH repetition then the PDSCH starts at subframe n+k, where k>0.

It has also been agreed that the repetition of the (E)PDCCH can be configured for different signal to noise ratio (SNR) levels depending on the channel quality indication (CQI) determined by a user device. For example, an MTC user device 3-2 located near the edge of the cell, the (E)PDCCH may be repeated 64 times, whereas an MTC user device located close to the centre of the cell may receive only 16 repetitions. Varying the level of repetition of the (E)PDCCH helps to optimise power management within the MTC user devices minimising unnecessary repetitions.

Search Spaces

User devices 3 do not know in advance when they will be signalled a resource allocation in the PDSCH, or which CCEs in the PDCCH will be used to signal those allocated resources. Therefore, each user device 3 must scan the resources used for carrying the PDCCH for resource allocation messages in every subframe 15. In order to keep the complexity of the process within reasonable limits, each user device 3 searches only a subset of the CCEs in a subframe. This subset, including all the possible locations of a PDCCH, is referred to as a search space. Each possible location of an (E)PDCCH is referred to as an '(E)PDCCH Candidate'.

As illustrated in FIG. 6, there are two types of search space: a common search space (CSS) 151 and a UE-specific search space (USS) 153. A UE is required to monitor both common and UE-specific search spaces.

The common search space 151 carries downlink control information which is common to all user devices 3. For example, the common search space 151 may include system information blocks (SIBs) which contain information related to cell access parameters, random access channel (RACH) message 2 (i.e. Random-Access Response) and RACH message 4 (i.e. Contention Resolution), and the paging channel (PCH). The maximum number of CCEs present in the common search space is 16.

The UE-specific search space 153 carries downlink control information for particular user devices, such as UE-specific resource allocations.

Ideally, the size of a search space should be as small as possible to minimise the processing burden on the user devices 3. However, smaller search spaces also place greater restrictions on the base station's scheduling algorithm.

The number of CCEs making up one (E)PDCCH candidate is called the aggregation level, and the user device 3 search space contains (E)PDCCHs with a mixture of aggregation levels. Table 1 shows the typical size of search spaces, which is based on the size of the legacy PDCCH search space.

TABLE 1

| Type | Search space $S_k^{(L)}$ | | |
|---|---|---|---|
| | Aggregation level L | Size [in CCEs] | Number of PDDCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

While the agreements discussed above have been reached, there are still numerous problems to be solved in the implementation of enhanced coverage of (E)PDCCH for MTC user devices 3-2.

For example, it is not clear which search space candidates should be used for (E)PDCCH and in turn which search space candidates should be monitored by a user device. One possibility is that the location of the enhanced coverage (E)PDCCH could be based on the already defined search space candidates used for legacy PDCCH, as shown in Table 1. As shown, at aggregation level 8 there are only two candidates for the defined search space and therefore the MTC user device 3-2 would only need to check two possible locations for each DCI format. For any given transmission, there could be downlink (DL) and/or uplink (UL) DCI formats. Therefore, in this case, the MTC user device 3-2 could assume that for each repetition, the same first candidate is used for the DL-DCI format and the same second candidate is used for the UL-DCI format, in order to facilitate coherent combining of data from the repetitions.

To date, the discussions surrounding the repetition of the (E)PDCCH have related to the repetition of the USS 153. There has been little or no discussion of the repetition of the CSS 151. However, the inventors have realised that repeating the CSS 151 presents further problems. In particular, the USS 153 is configured so that it can only be decoded by the user device 3 to which it relates and so repeating the USS 153 in several subframes does not cause problems for other user devices 3. However, since the CSS 151 is intended for receipt by all user devices 3, there is a risk that legacy user devices 3 may mistakenly decode each repetition of the repeated (E)PDCCH as an allocation of the resources 147 in the subframe carrying the repeated (E)PDCCH. The embodiments discussed below aim to address or at least alleviate this problem.

Provision for Legacy User Devices in Enhanced Coverage PDCCH

It is important that the development of enhanced coverage PDCCH retains backwards compatibility with legacy user devices. The inventors propose using the legacy common search space (CSS) for the enhanced coverage PDCCH channel intended for the MTC user devices 3-2 and therefore repetition of PDCCH control information will be implemented in the common search space as well as the UE-specific space (USS).

According to a first exemplary embodiment, confusion by legacy user devices is avoided by employing an increased aggregation level for the PDCCH of MTC user devices 3-2. Specifically, an aggregation level of 16 is employed, which means that the PDCCH takes up the entire CSS 151 (as the maximum number of CCEs present in the common search space is 16). Legacy user devices 3 are only configured to be able to decode up to an aggregation level of 8 (see Table 1) and therefore the legacy user devices 3 will not be able to decode a PDCCH at aggregation level 16 and thus the mistaken decoding of the repeated PDCCH by legacy user devices 3 is avoided.

However, as the use of aggregation level 16 will result in the whole CSS 151 of a subframe being consumed, there will not be any CCEs available for the base station 5 to schedule other control information. This may result in the blocking of the CSS 151 in a number of consecutive subframes. Accordingly, the use of repeated PDCCH at aggregation level 16 must be carefully considered to take into account these effects.

According to a second embodiment, the repeated PDCCH for MTC user devices uses an aggregation level lower than that of 16, for example aggregation levels 4 or 8, and instead a specific scrambling is applied to the PDCCH for MTC user devices 3-2. Preferably, this scrambling is applied using a new Radio Network Temporary Identifier (RNTI). Advantageously, scrambling prevents legacy devices 3 from mistakenly trying to decode any of the PDCCH repetitions, and avoids all of the available CCEs of the CSS 151 being consumed as can occur in the first embodiment (although there is still a possibility of blocking of the CSS in a number of consecutive subframes).

New Common Search Space in PDCCH for MTC User Devices

Figure 7:
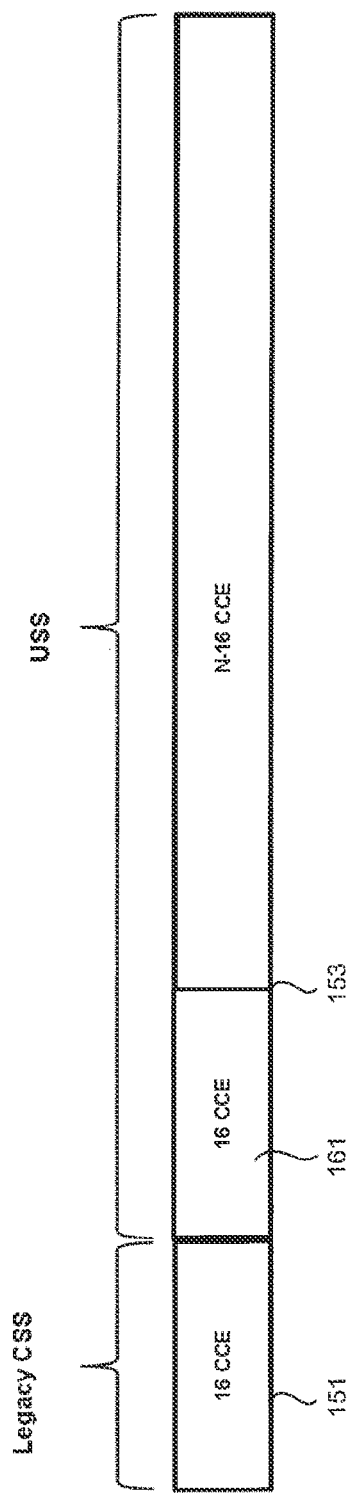
FIG. 7 illustrates a modified PDCCH structure in which a block of CCE elements forming part of a USS portion of a legacy PDCCH is used for repetitive signalling of control information for MTC devices.

FIG. 7 illustrates a PDCCH according to a third embodiment. In this embodiment, the PDCCH includes the legacy CSS 151 comprising 16 CCEs and the USS 153 comprising N CCEs. However, as illustrated in FIG. 7, the USS 153 comprises a new common search space for MTC user devices 3-2, labelled MTC-CSS 161. The new MTC-CSS 161 allows MTC user devices 3-2 to receive the common control information, while avoiding legacy user devices 3 attempting to decode this information, because the MTC-CSS 161 is not provided in the legacy CSS search space 151.

In this example, the MTC-CSS 161 consists of 16 CCEs and starts immediately after the legacy CSS 151. In this way the MTC user devices 3-2 know where to look for the MTC-CSS—which reduces the search space for the MTC-CSS. Of course, the same advantage is achieved regardless of where the MTC-CSS 161 is located within the USS, as long as its location is known by the MTC user devices 3-2 in advance.

In this embodiment, the base station 5 prioritises the MTC-CSS 161 over the UE-specific control information contained in the USS. Therefore, there is a degree of blocking of CCEs in the USS. However, as there are more CCEs in the USS than in the CSS, the blocking probability for a given user device is not severe.

Common Search Space in EPDCCH for MTC User Devices

As those skilled in the art will appreciate, the PDCCH is understood to be contained within a set of symbols at the start of the subframe, for example the first three symbols. As there is limited space within the PDCCH, it was proposed to transmit additional control data in the rest of the subframe traditionally used for carrying the PDSCH. This additional control data was defined to be contained within the "evolved" physical downlink control channel (EPDCCH). The way in which repetition of the EPDCCH can be achieved will now be explained.

Figure 8:
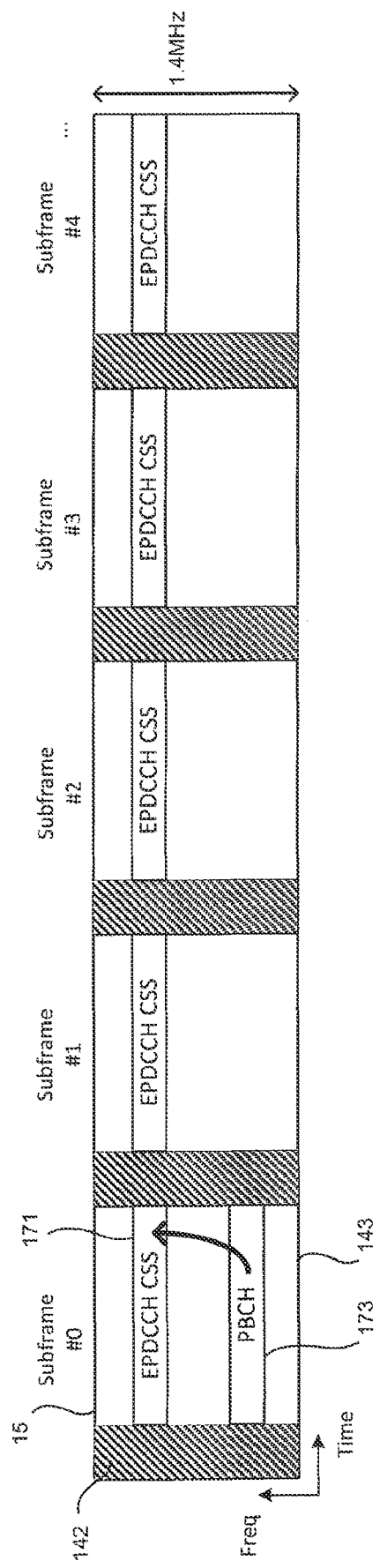
FIG. 8 illustrates the way in which an EPDCCH can be repeated in a number of subframes forming part of a radio frame for reception by an MTC device.

FIG. 8 illustrates a series of five subframes 15 forming part of a radio frame according to a fourth exemplary embodiment. In this exemplary embodiment, a common search space for MTC user devices 3-2 is provided in the EPDCCH. In this example, each subframe 15 includes a PDCCH 142 provided over the first three OFDM symbols. The remainder of each subframe comprises a PDSCH region 143 which can hold further transmissions such as the physical broadcast channel, PBCH, and the EPDCCH.

MTC user devices 3-2 often operate over a reduced bandwidth compared to typical user devices, and therefore in this exemplary embodiment the EPDCCH is provided within a reduced bandwidth of 1.4 MHz, which corresponds to 6 resource blocks.

In FIG. 8, the PDSCH region 143 of subframe 0 comprises a PBCH transmission 173 which signals the location and size of an EPDCCH CSS 171.

In order to signal the location of the EPDCCH CSS 171, multiple possible locations ($N_{EPDCCH\_location}$) for the EPDCCH are predefined. The number of different locations is given by:

$$N_{EPDCCH\_location} = N_{sb} = \left\lfloor \frac{N_{DL}^{RB}}{6} \right\rfloor$$

Where $N_{DL}^{RB}$ is the number of resource blocks across the whole downlink system bandwidth.

Typically, the downlink system bandwidth may be 20 MHz, which corresponds to 100 resource blocks. Therefore, in this case there are 16 different possible locations for the EPDCCH CSS.

One of the possible locations is signaled in the PBCH 173. Signalling the location of the EPDCCH CSS 171 transmitted by the base station 5 using the PBCH 173 beneficially allows the base station 5 to flexibly choose the location.

Currently in PBCH 173, there are a total of 24 bits, in which 14 are used. Therefore, there are 10 spare bits in PBCH 173 which can be used to signal the EPDCCH CSS 171. Methods for using these 10 bits to signal this information to the MTC user device 3-2 are discussed further below.

In order to signal the size of the EPDCCH CSS 171, the base station (E)PDCCH transmission module 519 is configured by the (E)PDCCH configuration module 517 to use one of a number of possible sizes for the EPDCCH CSS 171, in this exemplary embodiment either 2, 4 or 6 PRBs within the reduced bandwidth of 1.4 MHz. Therefore, one of the possible configurations is signaled by the base station 5 in the PBCH 173. Preferably, the 2, 4 or 6 PRBs are contiguous.

Common Search Space in EPDCCH for MTC User Devices—Accommodating Rate Matching Parameters When allocating the EPDCCH, the base station 5 must ensure there is no conflict with some of the reference signals that are transmitted within some subframes and the MTC user device 3-2 must know which resource elements will form part of the EPDCCH and which resource elements carry the reference signals. However, not all subframes of a radio frame will carry all reference signals.

In LTE, providing broadcast data, in particular mobile television, is a key aspect. Broadcast services such as mobile television are provided by dedicated resources in the form of a multicast-broadcast single-frequency network (MBSFN). These MBSFN subframes do not carry all of these reference signals. It has been decided that a number of particular subframes within a radio frame are designated as potential MBSFN subframes.

Figure 9:
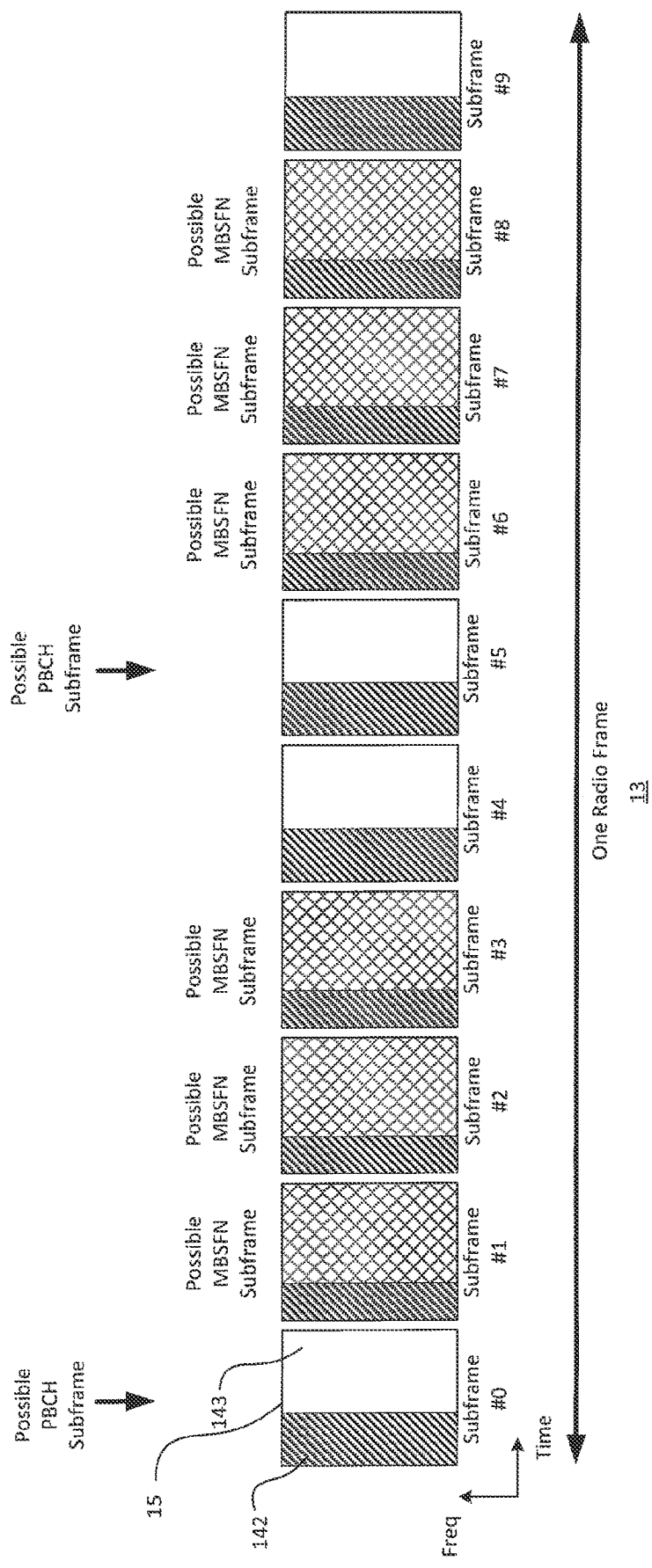
FIG. 9 illustrates one radio frame made up of 10 subframes and illustrating the possible locations of MBSFN subframes.

FIG. 9 illustrates one radio frame 13 made up of 10 subframes 15 numbered 0 to 9. In common with previous Figures, the first part of each subframe comprises a PDCCH region 142 and the latter part of each subframe comprises a PDSCH region 143. In the example illustrated in FIG. 9, the radio frame 13 is a frequency division duplex (FDD) frame and accordingly subframes 1, 2, 3, 6, 7 and 8 are designated as potential MBSFN subframes. It is noted that, for a time division duplex (TDD) frame, subframes 2, 3, 4, 7, 8 and 9 are designated as being potential MBSFN subframes.

In this example, the non-MBSFN subframes 0, 4, 5 and 9 include a PDCCH region 142 which comprises three OFDM symbols, while MBSFN subframes 1, 2, 3, 6, 7 and 8 include a reduced PDCCH region 142 which comprises only two OFDM symbols.

Furthermore, the physical broadcast channel (PBCH) is provided in particular subframes of a radio frame, in this example subframes 0 and 5 are designated as possible PBCH subframes.

Reference Signals

Figure 10:
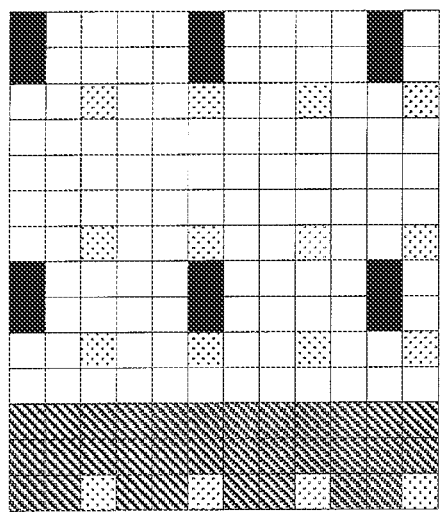
FIG. 10 shows a simplified illustration of a typical resource grid corresponding to a subframe used in the telecommunication system of FIG. 1.

FIG. 10 shows a simplified illustration of a typical resource grid of a subframe used in the telecommunication system 1 of FIG. 1. The subframe comprises a number of resource elements defined in time (i.e. in columns corresponding to 'symbols' along the horizontal axis of FIG. 10) and frequency (i.e. in rows corresponding to each 'subcarrier' along the vertical axis of FIG. 10). Each EPDCCH consists of an aggregation of control channel elements (CCEs'). The PDCCH 142 is carried in the first part of the subframe 15, as shown generally in the left hand side area of the subframe 15 of FIG. 10.

Some resource elements of the subframe are also used to carry cell reference signals (CRS) 154 and demodulation reference signals (DM RS) 155, both of which are transmitted by the base station 5 periodically, at predetermined intervals and predetermined locations within a subframe. These signals are used to provide reference signal levels and to inform the user device 3 about the current operation of the base station 5. Resource elements can be transmitted at varying energy levels but the CRS 154 resource elements are always transmitted at a known (e.g. a default) energy level. The user device 3 can thus carry out signal quality measurements over the CRS 154 resource elements and, based on these measurements, can indicate to the base station 5 the perceived signal quality of a given frequency band (of a given cell) operated by the base station 5.

In addition to CRS and DM-RS, the base station 5 may also transmit a channel state information reference signal (CSI-RS). The CSI-RS is used by user devices to determine the channel state and to report channel quality information (CQI) to the base station 5. CSI-RS is essentially an extension of the rate matching parameter CRS. In LTE Rel. 8, CRS was designed for use in channel estimation for up to four layer spatial multiplexing, where each antenna port (numbered ports 1 to 3) has a separate CRS. However, extension of the reference signals was required when LTE Rel. 10 introduced further antenna nodes to support additional layer spatial multiplexing (up to 8 layer spatial multiplexing). The CSI-RS reference signal was added in preference to extending the CRS to 8 layers as this would have added undesirable signalling overhead. CSI-RS is transmitted on different antenna ports (15 to 22) than CRS (0 to 3), although the same physical antennas may be used. Furthermore, while CRS only uses time/frequency orthogonality, CSI-RS uses code domain orthogonality in addition.

MBSFN subframes (such as subframes 1, 2, 3, 6, 7, 8 in FIG. 9) do not carry cell specific reference signals such as CRS or CSI-RS because MBSFN subframes are not cell-specific.

As explained above, it is necessary for user devices to be aware of which resource elements of the subframe contains the EPDCCH CSS 171.

In LTE Rel-11 a mapping parameter re-MappingQCL-ConfigId-r11 (as described in 3GPP TS 36.213 section 9.1.4.3, the full disclosure of which is hereby incorporated by reference) is used by user devices to determine the mapping of the EPDCCH CSS to resource elements. The mapping parameter includes a CRS ports count parameter, denoted crs-PortsCount-r11. This parameter is communicated to user devices on the PBCH. The mapping parameter also includes a CRS frequency shift parameter, crs-FreqShift-r11. This CRS frequency shift parameter is determined by a user device using the cell ID.

However, Rel-11 does not currently define how to inform a user device of other important ratematching parameters, in particular the configuration of MBSFN subframes within the radio frame, the location of channel state information reference signals (CSI-RS) in neighbouring cells, and the starting OFDM symbol of the EPDDCH CSS. These three parameters are respectively denoted as:

mbsfn-SubframeConfigList-r11;
csi-RS-ConfigZPId-r11;
pdsch-Start-r11.

A further ratematching parameter for the user devices 3 is the location of the CSI-RS in the serving cell. This parameter is denoted qcl-CSI-RS-ConfigNZPId-r11. In this exemplary embodiment, the location of the CSI-RS in the serving cell is configured in the same way as the location of CSI-RS in neighbouring cells, and therefore the qcl-CSI-RS-ConfigNZPId-r11 can be determined based on csi-RS-ConfigZPId-r11.

In order for user devices to locate the EPDCCH CSS it is necessary for the MTC user device 3-2 to obtain knowledge of the MBSFN subframe configuration, the CSI-RS configuration and the starting symbol of the EPDCCH CSS. Below are presented four options for providing these parameters, described with reference to FIGS. 11 to 14.

Option A

Figure 11:
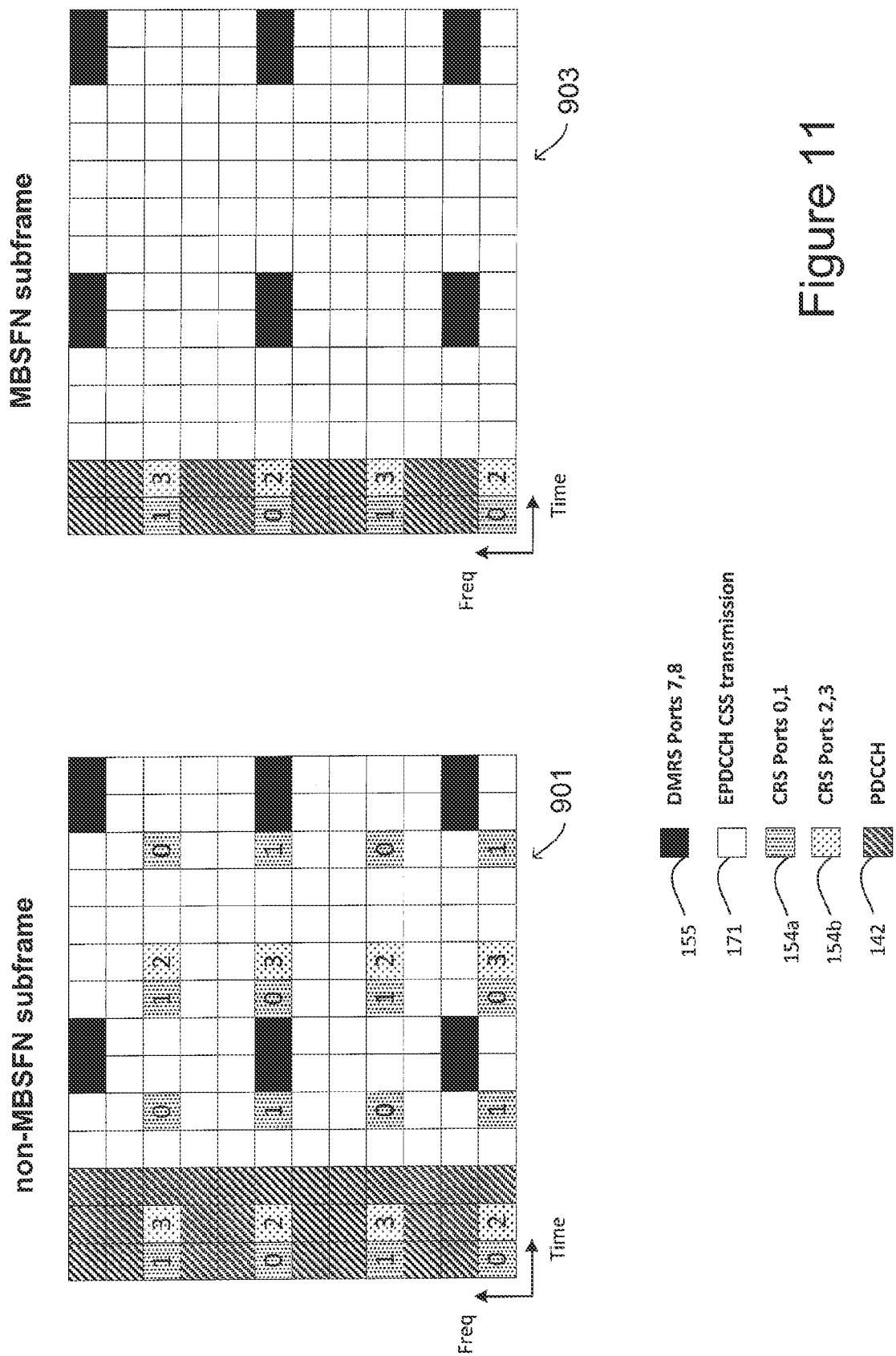
FIG. 11 is a simplified illustration of exemplary resource grids corresponding to a non-MBSFN subframe and an MBSFN subframe according to an option A.

FIG. 11 is a simplified illustration of exemplary resource grids 901 and 903, resource grid 901 corresponding to a non-MBSFN subframe and resource grid 903 corresponding to an MBSFN subframe.

As shown, the non-MBSFN subframe 901 carries CRS type reference signals 154a and 154b corresponding to antenna ports 0 to 3. The resource elements used to carry CRS are distributed throughout the time and frequency domain, where CRS for ports 0 and 1 are transmitted at symbols 1, 5, 8 and 12. The CRS for ports 2 and 3 are transmitted at symbols 2 and 9. The repetition of CRS resource elements corresponding to a particular port across the frequency domain illustrates the fact that CRS transmissions are frequency shifted for improved frequency diversity.

As shown in FIG. 11, the MBSFN subframe 903 does not include any CRS signals outside of the PDCCH because the CRS transmissions are cell specific. However, the demodulation reference signals (DMRS) 155 are carried by resource elements in both the non-MBSFN subframe 901 and the MSBSFN subframe 903. In this example, the DMRS resource elements are located at symbols 6, 7, 13 and 14 and are also frequency shifted.

According to option A, the PBCH channel is used to signal to the MTC user device 3-2 which subframes out of the six possible MBSFN subframes of the radio frame are used for EPDCCH CSS 171. These MBSFN subframes will not carry any CRS or CSI-RS transmissions outside of the PDCCH, and therefore all of the unshaded resource elements in the MBSFN subframe 903 can form part of the EPDCCH CSS 171.

Although all of these unshaded elements are available for EPDCCH CSS 171, it is noted that in most embodiments a subset of the subcarriers will be indicated by the PBCH 173 as carrying the EPDCCH CSS 171, and therefore the EPDCCH CSS 171 may only occupy a subset of the carriers illustrated in FIG. 11.

Furthermore, if any other non-MBSFN subframes are signalled, in the PBCH 173, to be used for EPDCCH CSS 171, then the MTC user device 3-2 assumes that there are no CSI-RS transmissions present in the indicated non-MBSFN subframes. Therefore, the EPDCCH CSS transmission can occupy all of the unshaded resource elements shown in the non-MBSFN subframe 901. However, as these non-MBSFN subframes include DMRS or CRS transmissions, the corresponding resource elements are not available for the EPDCCH CSS 171.

Accordingly, in option A the base station (E)PDCCH transmission module 519 is configured by the (E)PDCCH configuration module 517 to avoid placing the EPDCCH CSS 171 and CSI-RS in the same subframe. Alternatively, the base station (E)PDCCH transmission module 519 is configured by the (E)PDCCH configuration module 517 to puncture the corresponding CSI-RS resource elements (RE) when mapping EPDCCH CSS 171 to resource elements. In this case, if an EPDCCH CSS resource element collides with a CSI-RS location, then the CSI-RS is transmitted in that location while the EPDCCH CSS resource element is not transmitted in that location.

In option A, as shown in FIG. 11, the starting OFDM symbol for the EPDCCH CSS 171 is always fixed to the fourth OFDM symbol of the subframe for non-MBSFN subframes, as in these subframes the size of the PDCCH is three symbols. In MBSFN subframes, the starting OFDM symbol for the EPDCCH CSS 171 is fixed to the third OFDM symbol of the subframe, as in these subframes the size of the PDCCH is two symbols. In other exemplary embodiments, the starting OFDM symbol could be another symbol (known in advance) or the starting symbol could be signalled to the MTC user device 3-2 as well.

Option B

Figure 12:
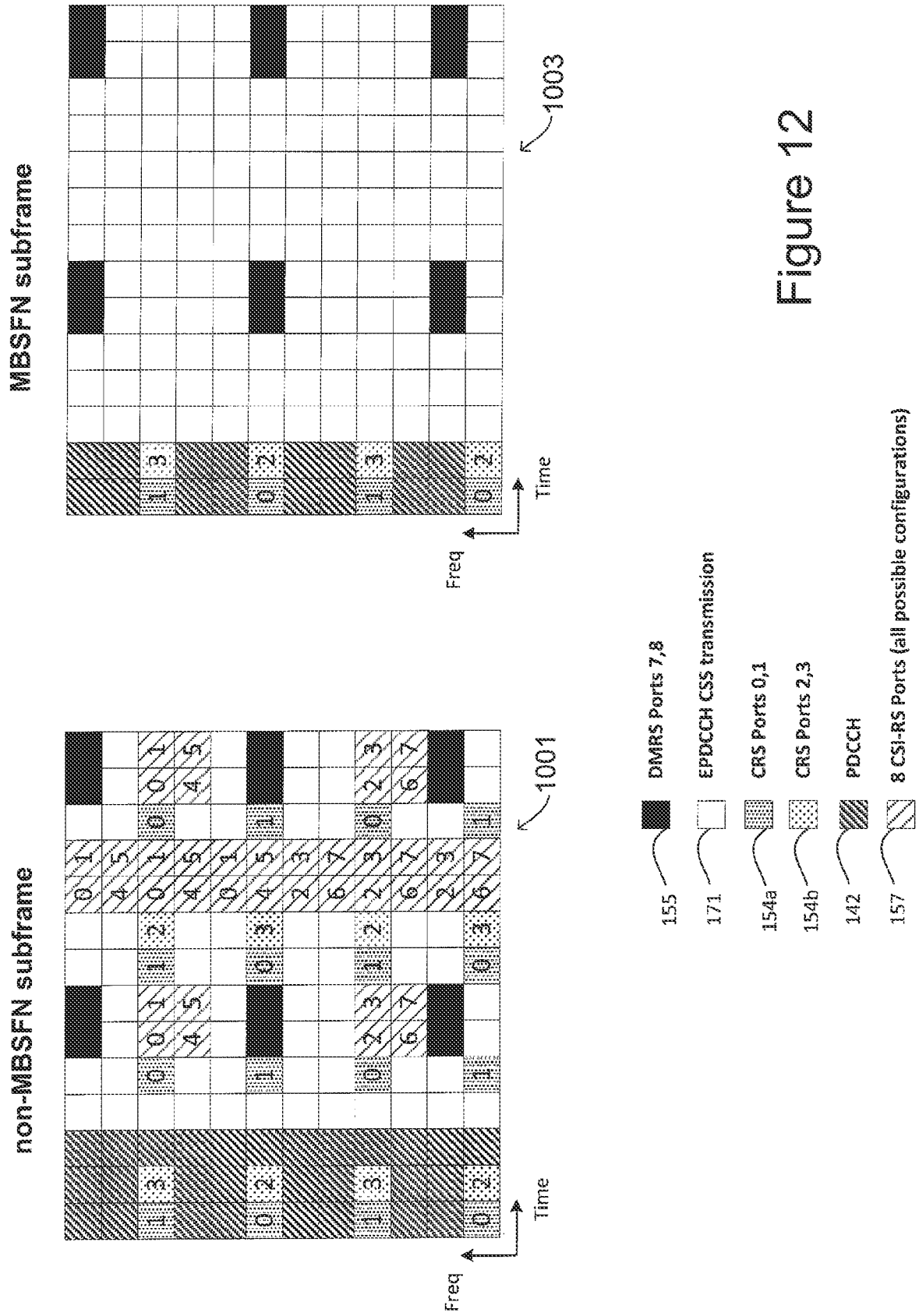
FIG. 12 is a simplified illustration of exemplary resource grids corresponding to a non-MBSFN subframe and an MBSFN subframe according to an option B.

FIG. 12 is a simplified illustration of exemplary resource grids 1001 and 1003, resource grid 1001 corresponding to a non-MBSFN subframe and resource grid 1003 corresponding to an MBSFN subframe.

As in option A, the non-MBSFN subframe 1001 carries CRS type reference signals 154*a* and 154*b* corresponding to antenna ports 0 to 3, and the DMRS 155 are carried by resource elements in both the non-MBSFN subframe 1001 and the MSBSFN subframe 1003. In this option, the PBCH channel is used to signal to the MTC user device 3-2 which subframes out of the six possible MBSFN subframes of the radio frame are used for the EPDCCH CSS 171. The MBSFN subframes will not carry any CRS or CSI-RS transmissions outside of the PDCCH, and therefore all of the unshaded resource elements in MBSFN subframe 1003 can form part of the EPDCCH CSS 171.

However, according to option B, the non-MBSFN subframe 1001 also carries CSI-RS type reference signals 157 corresponding to antenna ports 0 to 7. All of the possible configurations of CSI-RS 157 are indicated in subframe 1001 of FIG. 12. Therefore, if non-MBSFN subframes are signalled, in the PBCH 173, to be used for the EPDCCH CSS 171, then the MTC user device 3-2 assumes that all possible CSI-RS transmissions are present in the indicated non-MBSFN subframes. Therefore, the MTC user device 3-2 will exclude all of the potential CSI-RS REs from the EPDCCH CSS 171. The EPDCCH CSS 171 can occupy all of the unshaded resource elements shown in the non-MBNSFN subframe 1001, which is a lower total number of resource elements than in option A.

As in option A, although all of these unshaded elements are available for EPDCCH CSS 171, it is noted that in most exemplary embodiments a subset of the subcarriers will be indicated by the PBCH 173 as carrying the EPDCCH CSS 171, and therefore the EPDCCH CSS 171 may only occupy a subset of the carriers illustrated in FIG. 12.

Thus, in accordance with option B, the base station 5 can place the EPDCCH CSS 171 and the CSI-RS in the same subframe.

In option B, like in option A and as shown in FIG. 12, the starting OFDM symbol for the EPDCCH CSS 171 is fixed to the fourth OFDM symbol of the non-MBSFN subframes while in MBSFN subframes the EPDCCH CSS 171 is fixed to the third OFDM symbol. Fixing the starting OFDM symbol reduces the amount of information that has to ne signalled to the MTC user device 3-2.

Option C

Figure 13:
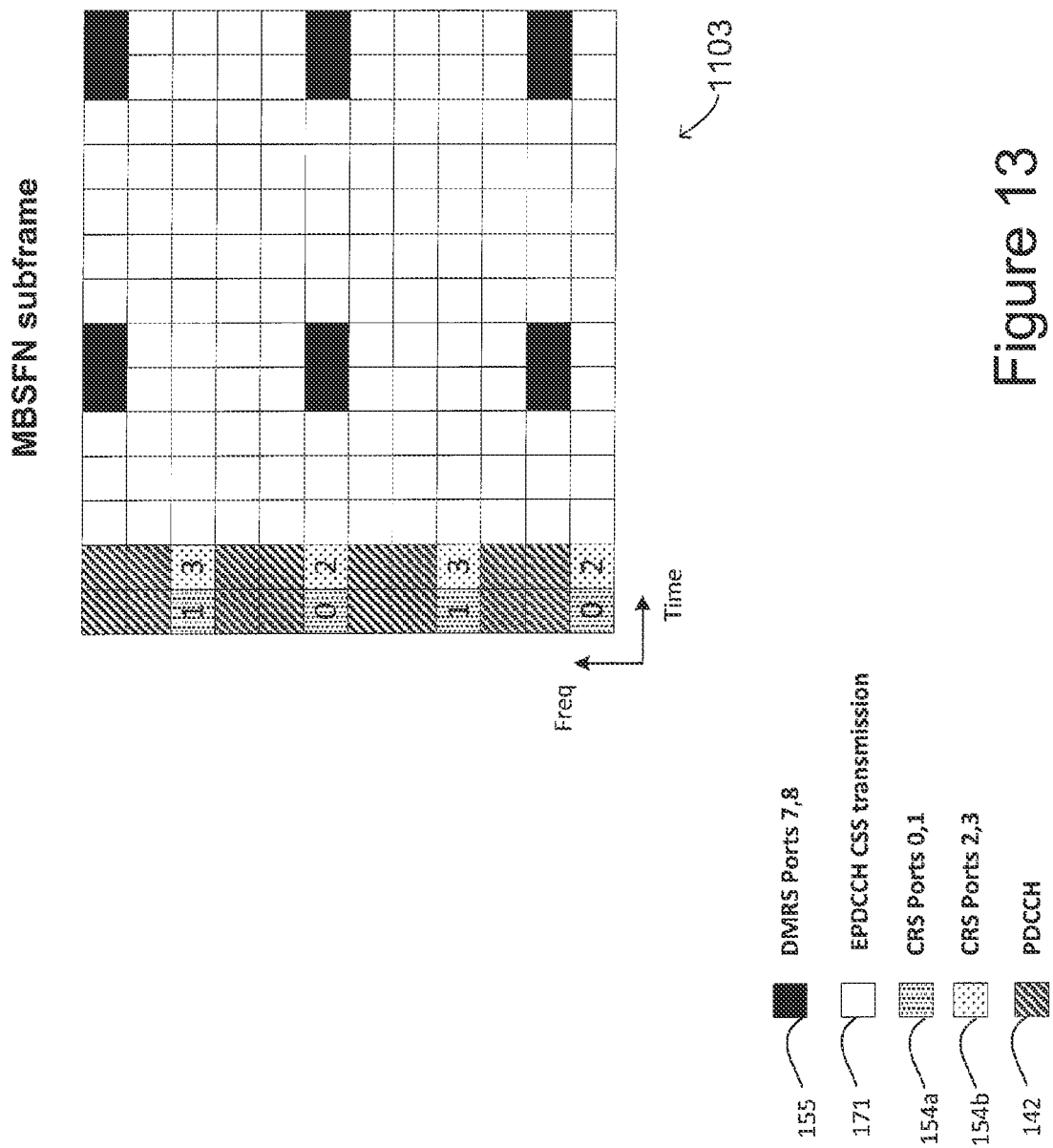
FIG. 13 is a simplified illustration of an exemplary resource grid corresponding to MBSFN subframes according to an option C.

FIG. 13 is a simplified illustration of an exemplary resource grid 1103 corresponding to an MBSFN subframe.

As in options A and B, in option C the PBCH channel is used to signal to the MTC user device 3-2 which subframes out of the six possible MBSFN subframes of the radio frame are used for the EPDCCH CSS 171. The MBSFN subframes 1103 will not carry any CRS or CSI-RS transmissions outside of the PDCCH, and therefore all of the unshaded resource elements in the MBSFN subframe 1103 can form part of the EPDCCH CSS 171. The DMRS 155 is also carried by resource elements in the MSBSFN subframe 1103.

According to option C, the EPDCCH CSS 171 is not transmitted in non-MBSFN subframes. Therefore, there is no issue of how to transmit CRS and/or CSI-RS in the same subframe as the EPDCCH CSS 171.

As in options A and B, although all of the unshaded elements of subframe 1103 are available for the EPDCCH CSS 171, it is noted that in most embodiments a subset of the subcarriers will be indicated by the PBCH 173 as carrying the EPDCCH CSS 171, and therefore the EPDCCH CSS 171 may only occupy a subset of the carriers illustrated in FIG. 13.

As in options A and B and as shown in FIG. 13, the starting OFDM symbol for the EPDCCH CSS 171 is fixed to the third OFDM symbol of the MBSFN subframe. As before, fixing the starting OFDM symbol reduces the amount of data that has to be signalled to the MTC user device 3-2.

Option D

Figure 14:
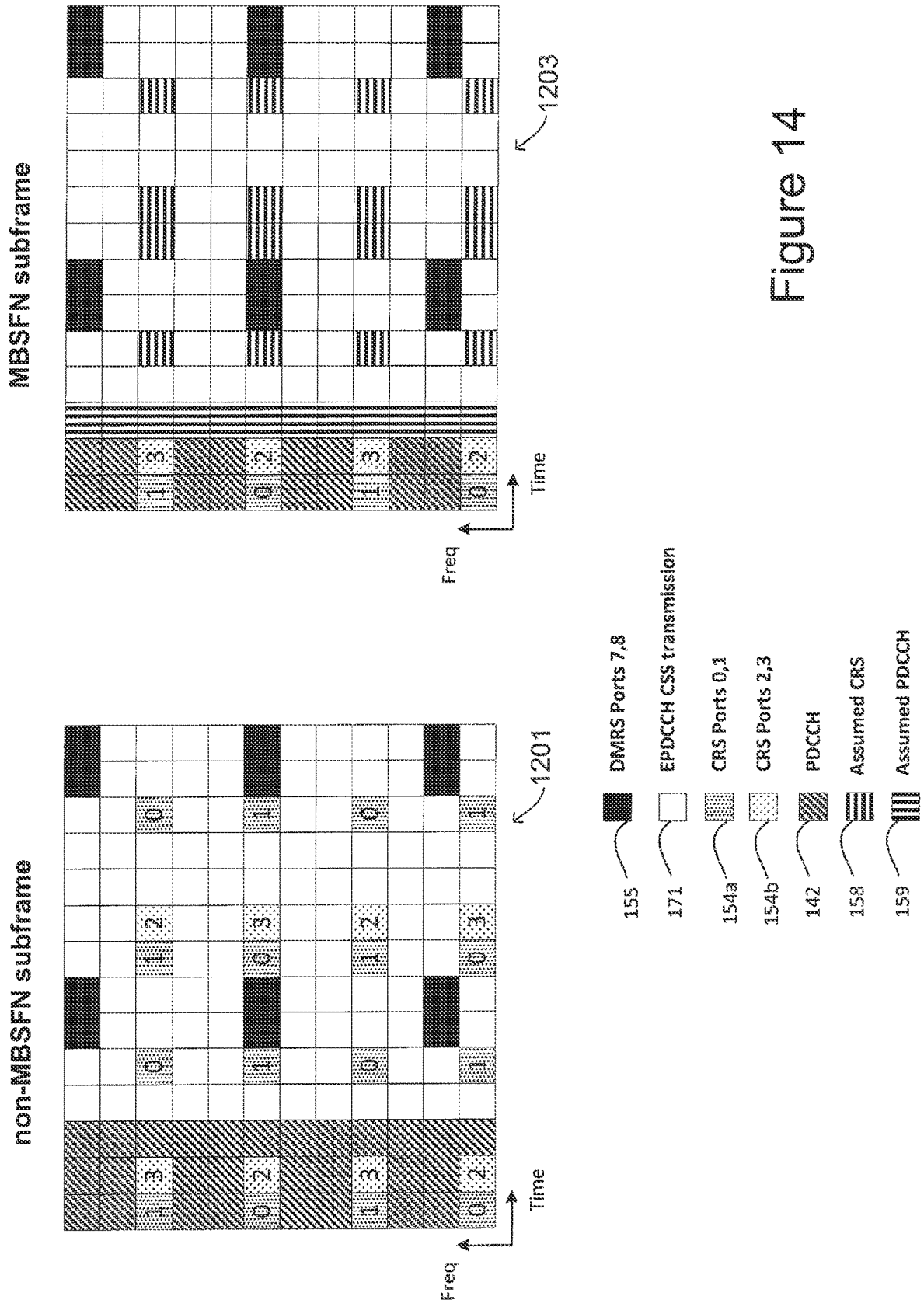
FIG. 14 is a simplified illustration of exemplary resource grids corresponding to a non-MBSFN subframe and an MBSFN subframe according to an option D.

FIG. 14 is a simplified illustration of exemplary resource grids 1201 and 1203, resource grid 1201 corresponding to a non-MBSFN subframe and resource grid 1203 corresponding to an MBSFN subframe.

In option D, the PBCH channel is used to signal to the MTC user device 3-2 which subframes are used for EPDCCH CSS 171, regardless of whether the subframes are MBSFN subframes or non-MBSFN subframes.

As in the previous options, the non-MBSFN subframe 1201 carries CRS type reference signals 154*a* and 154*b* corresponding to antenna ports 0 to 3, and the DMRS 155 are carried by resource elements in both the non-MBSFN subframe 1201 and the MSBSFN subframe 1203.

As illustrated in FIG. 14, the non-MBSFN subframe 1201 does not carry CSI-RS transmissions, and therefore in option D the base station (E)PDCCH transmission module 519 is configured by the (E)PDCCH configuration module 517 to avoid placing the EPDCCH CSS 171 and the CSI-RS in the same subframe.

In option D, the MTC user device 3-2 does not distinguish between non-MBSFN and MBSFN subframes, and therefore the user device 3 assumes that the same ratematching parameters are used in the non-MBSFN subframe 1201 and the MBSFN subframe 1203. As a result, the user device will exclude "assumed CRS" resource elements 158 from the EPDCCH CSS 171 of MBSFN subframes—even though those resource elements are not actually being used to carry the CRS signals. Similarly, the user device will exclude "assumed PDCCH" resource elements 159 at the third OFDM symbol from the EPDCCH CSS 171 of MBSFN subframes, even though MBSFN subframes do not include PDCCH at the third OFDM symbol.

Therefore, all of the unshaded resource elements in non-MBSFN subframe 1201 and those in MBSFN subframe 1203 can form part of the EPDCCH CSS 171.

As in the previous options, although all of these unshaded elements are available for EPDCCH CSS 171, it is noted that in most embodiments a subset of the subcarriers will be indicated by the PBCH 173 as carrying the EPDCCH CSS 171, and therefore the EPDCCH CSS 171 may only occupy a subset of the carriers illustrated in FIG. 14.

In option D as shown in FIG. 14, the starting OFDM symbol for the EPDCCH CSS 171 is fixed to the fourth OFDM symbol of the subframe for both non-MBSFN and MBSFN subframes, as the user device 3 is configured to exclude the third symbol from the EPDCCH CSS 171 for MSBFN subframes.

Signalling of EPDCCH CSS Information

As discussed above, the physical broadcast channel PBCH 173 has only 10 spare bits available for use in signaling information about the location and size of the EPDCCH CSS 171 and in which subframes it is repeated. Three options for utilizing these 10 bits of the PBCH 173 are described below.

Option 1

In this option, all 10 bits of the PBCH 173 are used by the base station 5 to signal which subframes of a radio frame are used to carry the repeated EPDCCH CSS 171. Therefore, as there are 10 subframes in a radio frame, each bit corresponds to a single subframe. The subframes may be indicated as "on" or "off" with respect to the EPDCCH CSS 171, e.g. a value of 0 means no EPDCCH CSS is present and a value of 1 means the EPDCCH CSS 171 is present. Accordingly, option 1 allows for every possible configuration of subframes to be signaled.

However, this option consumes all available bits so there is no room for other signaling parameters such as the subband for the EPDCCH CSS ($N_{EPDCCH\_location}$) and the number of PRBs configured for EPDCCH CSS 171. Therefore, if this option is used then the location and size of the EPDCCH CSS 171 must be fixed in advance or must be determinable from some other information—such as from the cell ID or signaled using other control information.

Option 2

In this option, the number of bits used to signal which subframes in a radio frame carry the EPDCCH CSS 171 is reduced, therefore reducing the flexibility in defining which subframes can be used. In this option, separate bits are coded for identifying which MBSFN subframes are used to carry the EPDCCH CSS 171 and which non-MBSFN subframes are used to carry the EPDCCH CSS 171. Table 2 below illustrates one example coding scheme that can be used in this option. As shown two bits are provided for identifying which MBSFN subframes are used to carry the EPDCCH CSS 171 and two bits are provided for identifying which non-MBSFN subframes are used to carry the EPDCCH CSS 171. Thus there are 8 different subframe configurations with this coding.

TABLE 2

| 6 MBSFN subframes for FDD | | 4 Non-MBSFN subframes for FDD | |
|---|---|---|---|
| 00 | Not used. | 00 | No EPDCCH CSS configured in this cell. |
| 01 | 1, 6 are used | 01 | 0, 5 are used |
| 10 | 2, 3, 7, 8 are used | 10 | 4, 9 are used |
| 11 | 1, 2, 3, 6, 7, 8 (all) are used | 11 | 0, 4, 5, 9 are used. |

The remaining six bits of the available ten bits in the PBCH 173 can then be used to signal the location and size of the EPDCCH CSS 171 within the band.

Option 3

This option also uses a reduced number of bits to signal which subframes are used to carry the EPDCCH CSS 171. However in option 3 joint coding of non-MBSFN and MBSFN subframes is used. Table 3 below illustrates one example joint coding scheme that can be used in this option. As shown three bits are provided for identifying which subframes are used to carry the EPDCCH CSS 171. As can be seen from Table 3, there are still eight different subframe configurations with this joint coding scheme which saves one bit compared to the coding scheme used in option 2 discussed above.

TABLE 3

| Joint coding of Non-MBSFN and MBSFN subframes for FDD | |
|---|---|
| 000 | No EPDCCH CSS configured in this cell |
| 001 | 0, 5, 4, 9 are used |
| 010 | 0, 5, 1, 6 are used |
| 011 | 0, 5, 2, 3, 7, 8 are used |
| 100 | 0, 5, 1, 2, 3, 6, 7, 8 are used |
| 101 | 4, 9, 2, 7 are used |
| 110 | 4, 9, 1, 3, 6, 8 are used |
| 111 | 4, 9, 1, 2, 3, 6, 7, 8 are used |

Thus the remaining seven bits of the available ten bits in the PBCH 173 can be used to signal the location and size of the EPDCCH CSS 171 within the band.

Modifications and Alternatives

Detailed exemplary embodiments have been described above. As those skilled in the art will appreciate, a number of modifications and alternatives can be made to the above exemplary embodiments whilst still benefiting from the inventions embodied therein.

In the above description relating to the EPDCCH CSS 171, the EPDCCH CSS 171 is provided within a reduced bandwidth of 1.4 MHz, and the location of this reduced bandwidth is signalled by the PBCH 173. In an alternative exemplary embodiment, the EPDCCH CSS 171 is not provided within a reduced bandwidth of 1.4 MHz. Instead, the PRBs reserved for the EPDCCH CSS 171 are distributed over the system bandwidth (e.g. of 20 MHz).

For example, the base station (E)PDCCH transmission module 519 may be configured by the (E)PDCCH configuration module 517 to use a fixed number of PRBs for the EPDCCH CSS 171, in blocks of 2, 4 or 6 PRBs, which are distributed over the system bandwidth in a pre-configured pattern. The MTC user device 3-2 will be pre-configured with the pattern and then may determine the size of the blocks—2, 4, or 6 PRBs either from signaling information received from the base station 5 over the PBCH or by calculation using some cell specific information—such as the cell ID.

The base station 5 may define a number of possible locations where the EPDCCH CSS 171 can be located, with the locations being chosen in neighbouring cells to minimize inter cell interference. In this case, the selected location could also be signaled to the MTC user device over the PBCH 173 or it could be determined from some (semi) static information, such as from the cell ID.

In the above exemplary embodiments, a radio frame comprised 10 subframes. As those skilled in the art will appreciate a radio frame may include any number of subframes. Further, the PDCCH region of a subframe may comprise any number of OFDM symbols.

The legacy CSS 151 and the MTC-CSS 161 illustrated in FIG. 7 each comprise 16 CCEs, however as those skilled in the art will appreciate, both CSSs may comprise any number of CCEs.

Although the MTC-CSS 161 as illustrated in FIG. 7 commences immediately after the legacy CSS, the MTC-CSS can be allocated anywhere in the USS. Preferably, the location within the USS is fixed.

In many of the exemplary embodiments described above, the EPDCCH is provided within a reduced bandwidth of 1.4 MHz. This is not essential, other bandwidths are possible.

Similarly, in FIGS. 8 and 10 to 14, the EPDCCH CSS 171 starts immediately after the PDCCH, specifically on the fourth OFDM symbol. However, the EPDCCH CSS 171 may be configured to start at any symbol.

In the description above, the location of the CSI-RS in the serving cell is configured in the same way as the location of CSI-RS in neighbouring cells, and therefore the qcl-CSI-RS-ConfigNZPId-r11 can be determined based on csi-RS-ConfigZPId-r11. Alternatively, the location of CSI-RS may be configured differently in serving and neighbouring cells, and therefore both qcl-CSI-RS-ConfigNZPId-r11 and csi-RS-ConfigZPId-r11 are signalled to the user device 3 by the base station 5. In either case, when both parameters are configured, user devices are configured to assume no data (PDSCH/EPDCCH) is mapped on those locations (e.g. the EPDCCH CSS 171 does not include the resource elements carrying CSI-RS).

In the above description, information relating to the EPDCCH CSS 171, such as its location and size, is signaled in the PBCH 173. Alternatively or additionally, some or all of this information can be obtained by the user device in a different manner—for example the location and size may be signaled on a different channel.

Furthermore, the location of the EPDCCH CSS 171 may not be signaled in the PBCH 173 and may instead be determined based upon other information, such as the Cell ID associated with the base station 5. Specifically, this may be determined in a cyclical manner, e.g by Cell ID mod $N_{EPDCCH\_location}$. This has the benefit of reducing the amount of data that has to be signaled to the MTC user device, although in this case it is not practical to change the location based on prevailing radio conditions.

It will be appreciated that although the communication system 1 is described in terms of base stations 5 operating as E-UTRAN base stations, the same principles may be applied to base stations operating as macro or pico base stations, femto base stations, relay nodes providing elements of base station functionality, home base stations (HeNB), or other such communication nodes.

In the above exemplary embodiments, an LTE telecommunications system was described. As those skilled in the art will appreciate, the signalling techniques described in the present application can be employed in other communications systems, including earlier 3GPP type systems. Other communications nodes or devices may include user devices such as, for example, personal digital assistants, laptop computers, web browsers, etc.

In the exemplary embodiments described above, the base stations 5 and user devices 3 each include transceiver circuitry. Typically, this circuitry will be formed by dedicated hardware circuits. However, in some exemplary embodiments, part of the transceiver circuitry may be implemented as software run by the corresponding controller.

In the above exemplary embodiments, a number of software modules were described. As those skilled in the art will appreciate, the software modules may be provided in compiled or un-compiled form and may be supplied to the base station or the user device as a signal over a computer network, or on a recording medium. Further, the functionality performed by part or all of this software may be performed using one or more dedicated hardware circuits.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

Introduction

In RAN1 #75, it has been agreed that repetition of (E-)PDCCH across multiple sub-frames is supported for UEs in enhanced coverage mode of low cost MTC. The agreements are as follows:

Agreements:
 For UEs in enhanced coverage mode for MTC
  For UE-specific search space,
   (E)PDCCH to schedule PDSCH is supported.
   Repetition of (E)PDCCH with multiple levels is supported.
   From the UE perspective, the possible starting sub-frames of (E)PDCCH repetitions are limited to a subset of sub-frames.
 For UEs in enhanced coverage mode for MTC, if/when PDSCH is indicated via (E)PDCCH:
   The relation of PDSCH timing to (E)PDCCH timing shall be known to UE and shall not be configurable by higher layer parameter dedicated only for this purpose and shall not be indicated by (E)PDCCH. FFS on how to derive it or fixed by spec.
   Assigned PDSCH is transmitted not before end of (E)PDCCH, i.e., if subframe n is the last (E)PDCCH repetition then PDSCH start n+k (k>0)

In this contribution, we discuss some details of the (E)PDCCH relating USS and CSS search space design for enhanced coverage of low cost MTC UEs and provide some proposals at the end.

UE Specific Search Space for MTC

In RAN1 #75, repetition in time domain has been agreed for (E-)PDCCH for low cost MTC UEs in coverage enhanced mode. This means that UE has to combine (E-)PDCCH repetitions across multiple subframes in time domain. In order UE to do that, UE has to know the location of CCEs from the search space in each subframe as well as the start and end of subframes carrying the repetition of the (E-)PDCCH.

As discussed in the last meeting [5] and email discussion after the meeting, one possible way to determine the location of CCEs from the UE specific search space (USS) is to use the same legacy PDCCH candidates "m" in Table 9.1.1-1 (TS 36.213 section 9.1) with same aggregation level in each repetition, so that UE can combine each candidate with the same candidate from the repeated subframes. For example aggregation level 8, there are two candidates based on existing Table 9.1.1-1, MTC UE can combine each candidate from each repeated subframe, and when it reaches the final repetition subframe, it tries to decode blindly these candidates similar to Release-8 (e.g. DL/UL DCI formats).

For E-PDCCH, the same principle as PDCCH can be applied. However, it is FFS whether to support higher aggregation levels than currently supported by E-PDCCH search space in order to reduce the number of repetitions in time-domain.

Furthermore, the timing of (E-)PDCCH to PDSCH has been agreed in the last meeting which states that if subframe n is the last (E-)PDCCH repetition then PDSCH start n+k (k>0). We think that the parameter "k" should be decided in such a way that the complexity of the scheduling decisions are minimised, for example k=1.

Proposal 1: agree to determine the location of CCEs from the USS by using the same legacy (E)PDCCH candidates "m" with same aggregation level in each repetition, so that UE can combine them respectively.

Common Search Space for MTC

Common search space in PDCCH: common information such as SIB, RACH message 2/4 and PCH for MTC UEs can be sent on legacy common search space (CSS). However, as PDCCH for low cost MTC would be repeated in multiple subframes before trying the actual decoding of the PDCCH, the legacy UE may be confused or decode mistakenly the individual repeated PDCCH in those subframes where there is no corresponding PDSCH carrying common control information. So, there are different possible solutions as follows:

One way to avoid the legacy UE to decode repeated PDCCH is to use aggregation level 16 (AL16) for low cost MTC. However, this AL16 will consume the whole CSS space, meaning that there will not be any remaining CCEs for eNB to schedule some other important control information. Therefore, this solution causes blocking of CSS in number of consecutive subframes. So, it is not efficient solution.

Another way is to apply a specific scrambling on PDCCH that is intended solely for low cost MTC. This kind of scrambling could be a new RNTI (i.e. MTC-RNTI). However, based on this solution, there is still concern that MTC UEs may consume a lot of resources which may cause blocking of CSS in number of consecutive subframes.

Figure 15:
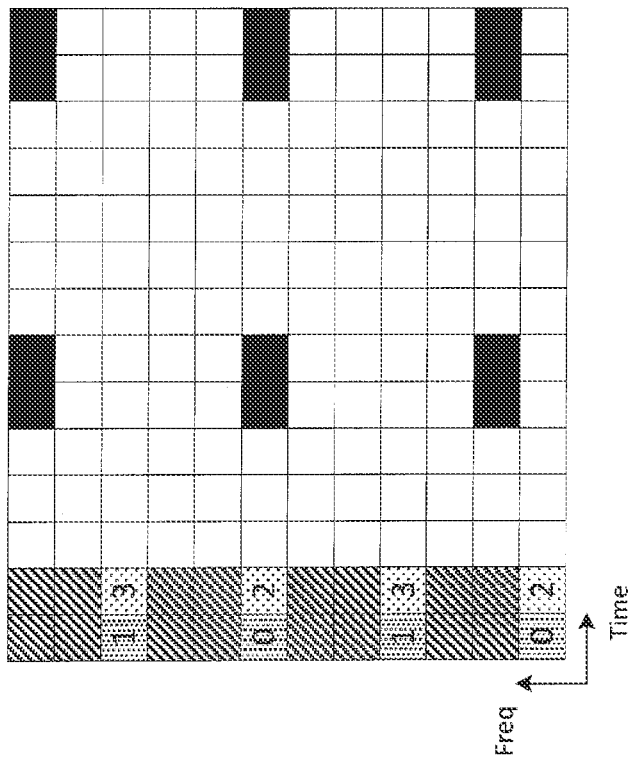
FIG. 15 is a view for use in describing another solution to design an enhanced CSS (ECCS) in EPDCCH for low cost MTC.
Figure 15:
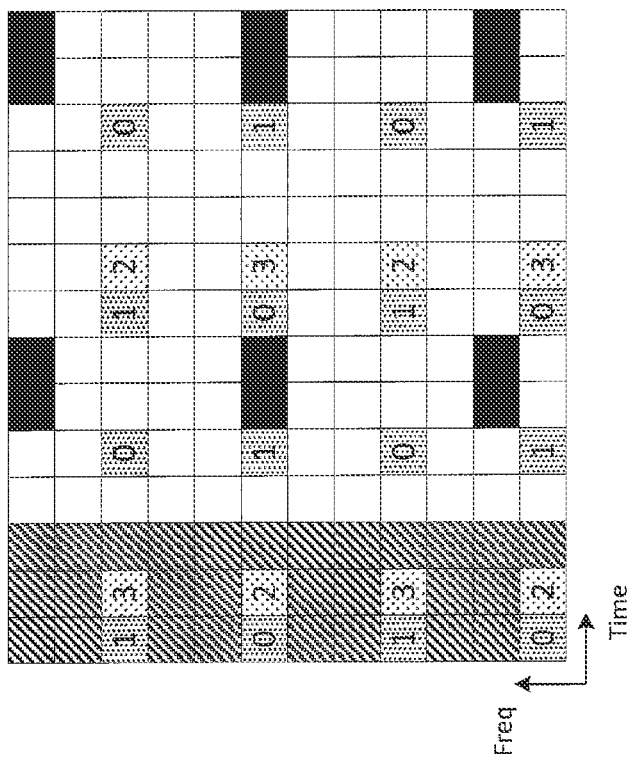

Common search space in EPDCCH: Another solution is to design an enhanced CSS (ECSS) in EPDCCH for low cost MTC as shown on FIG. 15. While this solution solves the above issue, it also provides additional benefits of applying higher aggregation levels which will reduce the number of repetitions in time domain, power boosting, as well as interference coordination among cells. Some design principles for ECSS are:

The resources for ECSS in EPDCCH can be signaled in PBCH.

The ratematching parameters for ECSS can be determined as follows:

Number of CRS ports, CRS-shift of non-MBSFN subframes used for ECSS can be acquired from PBCH.

MBSFN subframes used for ECSS can be added in PBCH.

eNB can avoid placing ECSS on subframe(s) that contains CSI-RS

Starting symbol for ECSS can be always fixed to $4^{th}$ and $3^{rd}$ OFDM symbol for non-MBSFN and MBSFN subframes respectively.

Antenna port numbers and their initialization parameters (e.g. $c_{init}$ value) can be fixed and or derived from Cell ID.

Proposal 2: consider a solution of how to avoid the legacy UE to decode mistakenly the individual repeated PDCCH in subframes where there is no corresponding PDSCH carrying common control information.

Proposal 3: consider to introduce enhanced CSS (ECSS) in EPDCCH for low cost MTC as it provides benefits of applying higher aggregation levels which will reduce the number of repetitions in time domain, power boosting as well as interference coordination among cells.

CONCLUSION

In this contribution, we have discussed some details of the design of (E)PDCCH relating USS and CSS search spaces for enhanced coverage of low cost MTC UEs and we have the following proposals:

Proposal 1: agree to determine the location of CCEs from the USS by using the same legacy (E)PDCCH candidates "m" with same aggregation level in each repetition, so that UE can combine them respectively.

Proposal 2: consider a solution of how to avoid the legacy UE to decode mistakenly the individual repeated PDCCH in subframes where there is no corresponding PDSCH carrying common control information.

Proposal 3: consider to introduce enhanced CSS (ECSS) in EPDCCH for low cost MTC as it provides benefits of applying higher aggregation levels which will reduce the number of repetitions in time domain, power boosting as well as interference coordination among cells.

The whole or part of the exemplary embodiments disclosed above can be described as, but not limited to, the following supplementary notes.

(Supplementary note 1). A communications node operable to schedule resources for use by a plurality of user devices, including legacy user devices and non-legacy user devices, for communicating with the communications node, the communications node comprising:

means for generating control data for transmission to the user devices, the control data including common control data for reception and decoding by a plurality of user devices and user specific control data for reception and decoding by a specific user device; and means for transmitting the generated control data in a sequence of subframes for reception by the user devices;

wherein the means for generating is configured to generate common control data for reception and decoding by the non-legacy user devices which cannot be decoded by the legacy user devices; and wherein the means for transmitting is configured to transmit repeats of the common control data generated for reception and decoding by non-legacy user devices within a plurality of subframes.

(Supplementary note 2). A communications node according to Supplementary note 1, wherein the control data is transmitted using a plurality of control channel elements, CCEs, and wherein the common control data for reception and decoding by the non-legacy user devices is transmitted using an aggregation of at least sixteen CCEs that cannot be decoded by the legacy user devices.

(Supplementary note 3). A communications node according to Supplementary note 1, wherein the common control data for reception and decoding by the non-legacy user devices is encrypted using an encryption key that is unavailable to the legacy user devices.

(Supplementary note 4). A communications node according to Supplementary note 1, wherein the control data is transmitted in a physical downlink common control channel, PDCCH, wherein common control data for legacy user devices is located in a first part of the PDCCH and user specific control data for legacy user devices is located in a second part of the PDCCH; and wherein the common control data for the non-legacy user devices is located in the second part of the PDCCH.

(Supplementary note 5). A communications node according to Supplementary note 1, wherein each subframe includes a physical downlink common control channel, PDCCH, part and a physical downlink shared channel, PDSCH, part and wherein the common control data for reception and decoding by the non-legacy user devices is transmitted within the PDSCH part of the subframe.

(Supplementary note 6). A communications node according to Supplementary note 5, wherein the communications node is configured to transmit signalling information to the non-legacy user devices identifying the subframes in which the common control data for reception and decoding by the non-legacy user devices is transmitted.

(Supplementary note 7). A communications node according to Supplementary note 6, wherein the data identifying the subframes identifies only multimedia broadcast single frequency network, MBSFN, subframes as carrying the common control data for reception and decoding by the non-legacy user devices.

(Supplementary note 8). A communications node according to Supplementary note 6, wherein the data identifying the subframes identifies multimedia broadcast single frequency network, MBSFN, subframes and non-MBSFN subframes as carrying the common control data for reception and decoding by the non-legacy user devices.

(Supplementary note 9). A communications node according to Supplementary note 8, wherein the communications node is configured to avoid placing the common control data for reception and decoding by the non-legacy user devices and channel state information reference signals, CSI-RS, in the same subframe.

(Supplementary note 10). A communications node according to any of Supplementary notes 6 to 9, wherein the communications node is configured to transmit said signalling information using a physical broadcast channel, PBCH.

(Supplementary note 11). A communications node according to any of Supplementary notes 6 to 10, wherein the communications node is configured to communicate with the user devices using radio frames having N subframes and wherein the signalling information comprises N bits, corresponding to one bit for identifying if a corresponding one of the N subframes carries the common control data for reception and decoding by the non-legacy user devices.

(Supplementary notes 12). A communications node according to any of Supplementary notes 6 to 11, wherein the communications node is configured to communicate with the user devices using radio frames having N subframes and wherein the signalling information comprises M bits, where M is less than N, that identify one of a number of predetermined configuration of the N subframes that will carry the common control data for reception and decoding by the non-legacy user devices.

(Supplementary note 13). A communications node according to Supplementary note 12, wherein the data identifying the subframes identifies multimedia broadcast single frequency network, MBSFN, subframes and non-MBSFN subframes as carrying the common control data for reception and decoding by the non-legacy user devices and wherein the M bits jointly encode which MBSFN subframes and which non-MBSFN subframes of a radio frame will carry the common control data for reception and decoding by the non-legacy user devices.

(Supplementary note 14). A communications node according to any of Supplementary notes 5 to 13, wherein the communications node is configured to transmit the common control data for reception and decoding by the non-legacy user devices in subframes that do not include channel state information reference signals, CSI-RS, or channel reference signals, CRS.

(Supplementary note 15). A communications node according to any of Supplementary notes 5 to 13, wherein the communications node is configured to transmit the common control data for reception and decoding by the non-legacy user devices in subframes that include channel state information reference signals, CSI-RS, or channel reference signals, CRS; and is configured to avoid using resources to carry the common control data for reception and decoding by the non-legacy user devices that are used to carry the CSI-RS or the CRS.

(Supplementary note 16). A communications node according to any of Supplementary notes 1 to 15, wherein the communications node is configured to transmit signalling information to the non-legacy user devices identifying the location within a subframe of the common control data for reception and decoding by the non-legacy user devices.

(Supplementary note 17). A communications node according to Supplementary note 16, wherein there is a fixed number of possible locations within a subframe for the common control data for reception and decoding by the non-legacy user devices, and wherein the communications node is configured to signal data identifying one of the possible locations.

(Supplementary note 18). A communications node according to any of Supplementary notes 1 to 15, wherein there is a fixed number of possible locations within a subframe for the common control data for reception and decoding by the non-legacy user devices, and wherein the communications node is configured to transmit the common control data for reception and decoding by the non-legacy user devices in a location that depends upon a static or semi static system variable, such as a cell ID associated with the communications node.

(Supplementary note 19). A communications node according to any of Supplementary notes 1 to 18, wherein the communications node is configured to signal data identifying a size of the common control data for reception and decoding by the non-legacy user devices.

(Supplementary note 20). A communications node according to Supplementary note 19, wherein the size of the common control data for reception and decoding by the non-legacy user devices is one of a plurality of possible sizes and wherein the communications node is configured to signal data indicating one of the plurality of sizes.

(Supplementary note 21). A communications node according to any of Supplementary notes 1 to 20, wherein the common control data for reception and decoding by the non-legacy user devices is carried on a plurality of resource blocks, RBs, and wherein the RBs are either arranged contiguously within a subframe or are dispersed within a subframe.

(Supplementary note 22). A communications node operable to schedule resources for use by a plurality of user devices for communicating with the communications node, the communications node comprising:
 means for generating control data for transmission to the user devices, the control data including common control data for reception and decoding by a plurality of user devices and user specific control data for reception and decoding by a specific user device;
 means for generating reference signals for use in controlling communications between the communications node and the user devices; and
 means for transmitting the generated reference signals and the generated control data in a sequence of subframes for reception by the user devices, each subframe including a physical downlink common control channel, PDCCH, part and a physical downlink shared channel, PDSCH, part;
 wherein generated reference signals and common control data for reception and decoding by a plurality of user devices are transmitted within the PDSCH part of the subframe; and
 wherein the means for transmitting is configured to transmit said common control data and said reference signals within the PDSCH part of subframes using different resource blocks contained therein.

(Supplementary note 23). A communications node according to Supplementary note 22, wherein the communications node is configured to carry the common control data in subframes that do not include channel state information reference signals, CSI-RS, or channel reference signals, CRS.

(Supplementary note 24). A communications node according to Supplementary note 22 or 23, wherein the communications node is configured to transmit the common control data in subframes that include channel state information reference signals, CSI-RS, or channel reference signals, CRS; and is configured to avoid using resources to carry the common control data that are used to carry the CSI-RS or the CRS.

(Supplementary note 25). A communications node according to any of Supplementary notes 22 to 24, wherein the communications node is configured to transmit signalling information to the user devices identifying the location within a subframe of the common control data.

(Supplementary note 26). A communications node according to Supplementary note 25, wherein there is a fixed number of possible locations within a subframe for the common control data and wherein the communications node is configured to signal data identifying one of the possible locations.

(Supplementary note 27). A communications node according to Supplementary note 25, wherein there is a fixed number of possible locations within a subframe for the common control data and wherein the communications node is configured to transmit the common control data in a location that depends upon a static or semi static system variable, such as a cell ID associated with the communications node.

(Supplementary note 28). A communications node according to any of Supplementary notes 22 to 27, wherein the communications node is configured to transmit signalling information to the non-legacy user devices identifying the subframes in which the common control data is transmitted.

(Supplementary note 29). A communications node according to Supplementary note 28, wherein the data identifying the subframes identifies only multimedia broadcast single frequency network, MBSFN, subframes as carrying the common control data.

(Supplementary note 30). A communications node according to Supplementary notes 28 or 29, wherein the data identifying the subframes identifies multimedia broadcast single frequency network, MBSFN, subframes and non-MBSFN subframes as carrying the common control data.

(Supplementary note 31). A communications node according to Supplementary note 30, wherein the communications node is configured to avoid placing the common control data for reception and decoding by the non-legacy user devices and channel state information reference signals, CSI-RS, in the same subframe.

(Supplementary note 32). A communications node according to any of Supplementary notes 28 to 31, wherein the communications node is configured to transmit said signalling information using a physical broadcast channel, PBCH.

(Supplementary note 33). A communications node according to any of Supplementary notes 28 to 32, wherein the communications node is configured to communicate with the user devices using radio frames having N subframes and wherein the signalling information comprises N bits, corresponding to one bit for identifying if a corresponding one of the N subframes carries the common control data.

(Supplementary note 34). A communications node according to any of Supplementary notes 28 to 33, wherein the communications node is configured to communicate with the user devices using radio frames having N subframes and wherein the signalling information comprises M bits, where M is less than N, that identify one of a number of predetermined configuration of the N subframes that will carry the common control data.

(Supplementary note 35). A communications node according to Supplementary note 34, wherein the data identifying the subframes identifies multimedia broadcast single frequency network, MBSFN, subframes and non-MBSFN subframes as carrying the common control data and wherein the M bits jointly encode which MBSFN subframes and which non-MBSFN subframes of a radio frame will carry the common control data.

(Supplementary note 36). A communications node according to any of Supplementary notes 1 to 35, wherein the non-legacy user devices include Machine Type Communications, MTC, user devices.

(Supplementary note 37). A communications node according to any of Supplementary notes 1 to 36, wherein the communications node starts said common control data on a starting symbol of the subframe that is known in advance by the non-legacy user devices.

(Supplementary note 38). A communications system comprising a communications node according to any of Supplementary notes 1 to 37 and at least one user device for receiving and decoding the common control data to control communications between the user device and the communications node.

(Supplementary note 39). A user device for communicating with a communications node, characterised in that the user device is configured to operate with the communications node of any of Supplementary notes 1 to 37 and adapted to be able to receive and decode the common control data to control communications with the communications node.

(Supplementary note 40). A method performed by a communications node that schedules resources for use by a plurality of user devices, including legacy user devices and non-legacy user devices, for communicating with the communications node, the method comprising:

generating control data for transmission to the user devices, the control data including common control data for reception and decoding by a plurality of user devices and user specific control data for reception and decoding by a specific user device; and transmitting the generated control data in a sequence of subframes for reception by the user devices;

wherein the generating generates common control data for reception and decoding by the non-legacy user devices which cannot be decoded by the legacy user devices; and wherein the transmitting transmits repeats of the common control data generated for reception and decoding by non-legacy user devices within a plurality of subframes.

(Supplementary note 41). A method performed by a communications node that schedules resources for use by a plurality of user devices for communicating with the communications node, the method comprising:

generating control data for transmission to the user devices, the control data including common control data for reception and decoding by a plurality of user devices and user specific control data for reception and decoding by a specific user device;

generating reference signals for use in controlling communications between the communications node and the user devices; and transmitting the generated reference signals and the generated control data in a sequence of subframes for reception by the user devices, each subframe including a physical downlink common control channel, PDCCH, part and a physical downlink shared channel, PDSCH, part;

wherein generated reference signals and common control data for reception and decoding by a plurality of user devices are transmitted within the PDSCH part of the subframe; and wherein the transmitting is configured to transmit said common control data and said reference signals within the PDSCH part of subframes using different resource blocks contained therein.

(Supplementary note 42). A communications node operable to schedule resources for use by a plurality of user devices, including legacy user devices and non-legacy user devices, for communicating with the communications node, the communications node comprising:

a control configuration module for generating control data for transmission to the user devices, the control data including common control data for reception and decoding by a plurality of user devices and user specific control data for reception and decoding by a specific user device; and a transmitter for transmitting the generated control data in a sequence of subframes for reception by the user devices;

wherein the control configuration module is configured to generate common control data for reception and decoding by the non-legacy user devices which cannot be decoded by the legacy user devices; and wherein the transmitter is configured to transmit repeats of the common control data generated for reception and decoding by non-legacy user devices within a plurality of subframes.

(Supplementary note 43). A communications node operable to schedule resources for use by a plurality of user devices for communicating with the communications node, the communications node comprising:

a control configuration module for generating control data for transmission to the user devices, the control data including common control data for reception and decoding by a plurality of user devices and user specific control data for reception and decoding by a specific user device;

a reference signal module for generating reference signals for use in controlling communications between the communications node and the user devices; and a transmitter for transmitting the generated reference signals and the generated control data in a sequence of subframes for reception by the user devices, each subframe including a physical downlink common control channel, PDCCH, part and a physical downlink shared channel, PDSCH, part;

wherein generated reference signals and common control data for reception and decoding by a plurality of user devices are transmitted within the PDSCH part of the subframe; and wherein the transmitter is configured to transmit said common control data and said reference signals within the PDSCH part of subframes using different resource blocks contained within the PDSCH part.

(Supplementary note 44). A user device for communicating with a communications node, the user device comprising:

means for receiving control data transmitted by the communications node, the control data including common control data for reception and decoding by the user device and user specific control data for reception and decoding by a specific user device;

wherein the received common control data is for reception and decoding by non-legacy user devices and cannot be decoded by legacy user devices;

wherein the means for receiving is configured to receive a plurality of subframes comprising said common control data;

means for combining the control data received from the plurality of subframes; and means for decoding the combined common control data.

(Supplementary note 45). A user device for communicating with a communications node, the user device comprising:

means for receiving subframes transmitted by the communications node, the subframes comprising control data including common control data for reception and decoding by a plurality of user devices and user specific control data for reception and decoding by a specific user device;

wherein the subframes include reference signals transmitted by the communications node for use in controlling communications between the communications node and the user device; and wherein the means for receiving is configured to receive a plurality of subframes comprising said common control data;

wherein each subframe includes a physical downlink common control channel, PDCCH, part and a physical downlink shared channel, PDSCH, part;

wherein received reference signals and common control data are received within the PDSCH part of the subframe using different resource blocks contained within the PDSCH part;

means for combining the control data received from the plurality of subframes; and means for decoding the combined common control data.

(Supplementary note 46). A user device for communicating with a communications node, the user device comprising:

a receiver for receiving control data transmitted by the communications node, the control data including common control data for reception and decoding by the user device and user specific control data for reception and decoding by a specific user device;

wherein the received common control data is for reception and decoding by non-legacy type user devices and cannot be decoded by legacy type user devices;

wherein the receiver is configured to receive a plurality of subframes comprising said common control data; and a control channel reception module for combining the control data received from the plurality of subframes and for decoding the combined common control data.

(Supplementary note 47). A user device for communicating with a communications node, the user device comprising:

a receiver for receiving subframes transmitted by the communications node, the subframes comprising control data including common control data for reception and decoding by a plurality of user devices and user specific control data for reception and decoding by a specific user device;

wherein the subframes include reference signals transmitted by the communications node for use in controlling communications between the communications node and the user device; and wherein the receiver is configured to receive a plurality of subframes comprising said common control data;

wherein each subframe includes a physical downlink common control channel, PDCCH, part and a physical downlink shared channel, PDSCH, part;

wherein received reference signals and common control data are received within the PDSCH part of the subframe using different resource blocks contained within the PDSCH part; and a control channel reception module for combining the control data received from the plurality of subframes and for decoding the combined common control data.

(Supplementary note 48). A method performed by a user device that communicates with a communications node, the method comprising:
- receiving control data transmitted by the communications node, the control data including common control data for reception and decoding by the user device and user specific control data for reception and decoding by a specific user device;
- wherein the received common control data is for reception and decoding by non-legacy user devices and cannot be decoded by legacy user devices;
- wherein the receiving receives a plurality of subframes comprising said common control data;
- combining the control data received from the plurality of subframes; and
- decoding the combined common control data.

(Supplementary note 49). A method performed by a user device that communicates with a communications node, the method comprising:
- receiving subframes transmitted by the communications node, the subframes comprising control data including common control data for reception and decoding by a plurality of user devices and user specific control data for reception and decoding by a specific user device;
- wherein the subframes include reference signals transmitted by the communications node for use in controlling communications between the communications node and the user device; and
- wherein the receiving receives a plurality of subframes comprising said common control data;
- wherein each subframe includes a physical downlink common control channel, PDCCH, part and a physical downlink shared channel, PDSCH, part;
- wherein received reference signals and common control data are received within the PDSCH part of the subframe using different resource blocks contained within the PDSCH part;
- combining the control data received from the plurality of subframes; and
- decoding the combined common control data.

(Supplementary note 50). A communications node operable to schedule resources for use by a plurality of user devices, including first type user devices and second type user devices, for communicating with the communications node, the communications node comprising:
- means for generating control data for transmission to the user devices, the control data including common control data for reception and decoding by a plurality of user devices and user specific control data for reception and decoding by a specific user device; and
- means for transmitting the generated control data in a sequence of subframes for reception by the user devices;
- wherein the means for generating is configured to generate common control data for reception and decoding by second type user devices which cannot be decoded by first type user devices; and
- wherein the means for transmitting is configured to transmit repeats of the common control data generated for reception and decoding by second type user devices within a plurality of subframes.

(Supplementary note 51). A communications node according to Supplementary note 50, wherein the first type user devices are legacy user devices and wherein the second type user devices are non-legacy user devices.

(Supplementary note 52). A communications node operable to schedule resources for use by a plurality of user devices for communicating with the communications node, the communications node comprising:
- means for generating control data for transmission to the user devices, the control data including common control data for reception and decoding by a plurality of user devices and user specific control data for reception and decoding by a specific user device;
- means for transmitting the generated control data in a sequence of subframes for reception by the user devices, each subframe including a physical downlink common control channel, PDCCH, part and a physical downlink shared channel, PDSCH, part;
- wherein the means for transmitting is configured to transmit repeats of the common control data generated for reception and decoding by non-legacy user devices within a plurality of subframes; and
- wherein the communications node is configured to transmit signalling information to the non-legacy user devices identifying the subframes in which the common control data for reception and decoding by the non-legacy user devices is transmitted.

(Supplementary note 53). A user device for communicating with a communications node, the user device comprising:
- means for receiving subframes transmitted by the communications node, the subframes comprising control data including common control data for reception and decoding by a plurality of user devices and user specific control data for reception and decoding by a specific user device;
- wherein the subframes include reference signals transmitted by the communications node for use in controlling communications between the communications node and the user device; and
- wherein the means for receiving is configured to receive a plurality of subframes comprising said common control data;
- wherein each subframe includes a physical downlink common control channel, PDCCH, part and a physical downlink shared channel, PDSCH, part;
- wherein received reference signals and common control data are received within the PDSCH part of the subframe using different resource blocks contained within the PDSCH part;
- means for identifying the common control data within the PDSCH part of the subframes using information about the location, or the expected location, of the reference control signals;
- means for combining the control data received from the plurality of subframes; and
- means for decoding the combined common control data.

(Supplementary note 54). A user device according to Supplementary note 53, wherein the means for identifying is further configured to use data signalled from the communications node to identify the common control data within the PDSCH part of the subframes.

What is claimed is:

1. A method for a base station, comprising:
   transmitting, to a user equipment (UE) first information indicating all of:
   a location in which a common search space of a physical downlink control channel (PDCCH) is located, one number, of three possible numbers, of resource blocks for the common search space, and a number of common search spaces per time resource, in a Physical Broadcast channel (PBCH) within a band which the UE uses, wherein the first information is represented by at most 10 bits.

2. The method according to claim 1, further comprising:
transmitting, to the UE, an aggregation level of Control Channel Elements (CCEs) for determining a candidates of PDCCH, wherein the aggregation level includes one of 4, 8, and 16.

3. The method according to claim 1, further comprising:
transmitting, to the UE, second information indicating a pattern of physical resource blocks (PRBs) for the PDCCH, wherein the second information is in units of 6 PBRs.

4. The method according to claim 3, wherein the second information indicates a replication of transmitting of the PDCCH.

5. A method for a user equipment user equipment (UE) comprising:

receiving, from a base station, first information indicating all of:

a location in which a common search space of a physical downlink control channel (PDCCH) is located, one number, of three possible numbers, of resource blocks for the common search space, and a number of common search spaces per time resource, in a Physical Broadcast channel (PBCH) within a band which the UE uses, wherein the first information is represented by at most 10 bits.

6. The method according to claim 5, further comprising:
receiving, from the base station, an aggregation level of Control Channel Elements (CCEs) for determining a candidates of PDCCH, wherein the aggregation level includes one or 4, 8, and 16.

7. The method according to claim 5, further comprising:
receiving, from the base station, second information indicating a pattern of physical resource blocks (PRBs) for the PDCCH, wherein the second information is in units of 6 PBRs.

8. The method according to claim 7, wherein the second information indicates a replication of transmitting of the PDCCH.

9. A base station comprising:
at least one memory storing instructions; and
at least one processor configured to process the instructions to transmit, to a user equipment (UE) first information indicating all of:

a location in which a common search space of a physical downlink control channel (PDCCH) is located, one number, of three possible numbers, of resource blocks for the common search space, and a number of common search spaces per time resource, in a Physical Broadcast channel (PBCH) within a band which the UE uses, wherein the first information is represented by at most 10 bits.

10. A user equipment (UE) comprising:
at least one memory storing instructions; and
at least one processor configured to process the instructions to receive, from a base station, first information indicating all of:

a location in which a common search space of a physical downlink control channel (PDCCH) is located, one number, of three possible numbers, of resource blocks for the common search space, and a number of common search spaces per time resource, in a Physical Broadcast channel (PBCH) within a band which the UE uses, wherein the first information is represented by at most 10 bits.

* * * * *